United States Patent
Durfee et al.

(10) Patent No.: US 7,949,210 B2
(45) Date of Patent: May 24, 2011

(54) SILICON-COMPATIBLE SURFACE PLASMON OPTICAL ELEMENTS

(75) Inventors: Charles G. Durfee, Boulder, CO (US);
Reuben T. Collins, Golden, CO (US);
Thomas E. Furtak, Golden, CO (US)

(73) Assignee: Colorado School of Mines, Golden, CO (US)

( * ) Notice: Subject to any disclaimer, the term of this patent is extended or adjusted under 35 U.S.C. 154(b) by 0 days.

(21) Appl. No.: 11/869,117

(22) Filed: Oct. 9, 2007

(65) Prior Publication Data

US 2009/0052827 A1 Feb. 26, 2009

Related U.S. Application Data

(60) Provisional application No. 60/828,731, filed on Oct. 9, 2006.

(51) Int. Cl.
*G02F 1/01* (2006.01)
*G02F 1/035* (2006.01)
*G02F 1/295* (2006.01)
*G02B 6/10* (2006.01)

(52) U.S. Cl. .......... 385/1; 385/2; 385/8; 385/9; 385/131

(58) Field of Classification Search .............. 385/1–4, 385/8, 9, 30, 41, 42, 129–132
See application file for complete search history.

(56) References Cited

U.S. PATENT DOCUMENTS

| | | | |
|---|---|---|---|
| 5,055,265 A | 10/1991 | Finlan | |
| 5,067,788 A * | 11/1991 | Jannson et al. | 385/2 |
| 5,337,183 A * | 8/1994 | Rosenblatt | 359/248 |
| 5,478,755 A | 12/1995 | Attridge et al. | |
| 5,606,633 A * | 2/1997 | Groger et al. | 385/12 |
| 5,776,785 A | 7/1998 | Lin et al. | |
| 5,830,766 A | 11/1998 | Attridge et al. | |
| 5,846,843 A | 12/1998 | Simon | |

(Continued)

OTHER PUBLICATIONS

"Observation of the two-dimensional Plasmon in silicon inversion layers," by Allen et al, Physical Review Letters, vol. 38, No. 17, Apr. 1977, pp. 980-983.*

(Continued)

*Primary Examiner* — Ryan Lepisto
*Assistant Examiner* — Robert Tavlykaev
(74) *Attorney, Agent, or Firm* — Greenlee Sullivan P.C.

(57) ABSTRACT

This invention provides fundamental science and novel device architectures for surface plasmon (SP)-based, complementary metal oxide semiconductor (CMOS)-compatible, optical elements such as modulators, couplers, and switches. The primary focus of the work is on waveguides based on an ultra-long-range surface plasmon (ULRSP) waveguide mode recently discovered by our team. This mode exists at the metal-dielectric interfaces in a silicon-oxide-metal-silicon layer structure. While initial work focuses on noble metals to support the ULRSP, our analysis shows Si processing-compatible metals such as Cu and Al can also be used. Our modeling has also shown that variation in the thickness of the oxide layer can be used to give unprecedented propagation lengths in such structures. Electrically-induced free carrier modulation of the dielectric constant in the Si adjacent to the oxide can modulate the waveguide properties allowing novel Si-compatible electro-optic devices to be created. These waveguides function as the "wiring" in new classes of optical chips. This invention also provides integration of ULRSP waveguides and switches with other optical elements to create entirely new classes of hybrid optoelectronic technologies for defense applications. These range from chip-based chemical agent detection to extremely high performance processors and even all-optical computations.

15 Claims, 13 Drawing Sheets

U.S. PATENT DOCUMENTS

| | | | |
|---|---|---|---|
| 6,034,809 A * | 3/2000 | Anemogiannis | 359/254 |
| 6,178,275 B1 * | 1/2001 | Nerses et al. | 385/14 |
| 6,330,387 B1 | 12/2001 | Salamon et al. | |
| 6,421,128 B1 | 7/2002 | Salamon et al. | |
| 6,731,388 B1 | 5/2004 | Simon et al. | |
| 7,583,882 B2 | 9/2009 | Guo | |
| 2005/0249451 A1 * | 11/2005 | Baehr-Jones et al. | 385/14 |
| 2006/0066249 A1 | 3/2006 | Wark et al. | |

OTHER PUBLICATIONS

"Surface Plasmon polariton based modulators and switches operating at telecom wavelengths," by Nikolajsen et al, Applied Physics Letters, vol. 85, No. 24, Dec. 2004, pp. 5833-5835.*

"Characterization of long-range surface-plasmon-polariton waveguides," by Berini et al, Journal of Applied Physics, vol. 98, pp. 043109-1 through 043109-12, 2005.*

Agarwal et al. (Dec. 1, 1996) "Low-Loss Polycrystalline Silicon Waveguides for Silicon Photonics," *J. Appl. Phys.* 80(11):6120-6123.

Akbar et al. (Feb. 20, 2006) "Optimization of Precursor Pulse Time in Improving Bulk Trapping Characteristics of Atomic-Layer-Deposition $HfO_2$ Gate Oxides," *Apple. Phys. Lett.* 88(8):082901.

Barrios et al. (Apr. 2003) "Low-Power-Consumption Short-Length and High-Modulation-Depth Silicon Electrooptic Modulator," *J. Lightwave Technol.* 21:1089-1098.

Barnes et al. (Aug. 14, 2003) "Surface Plasmon Subwavelength Optics," *Nature* 424:824-830.

Berini et al. (2005) "Characterization of Ling-Range Surface-Plasmon-Polariton Waveguides," *J. Appl. Phys.* 98:43109.

Burstein et al. (1974) "Surface Polaritons-Propagating Electromagnetic Model at Interfaces," *J. Vac. Sci. Technol.* 11:1004-1019.

Byahut et al. (Jan. 1990) "A Device for Performing Surface-Plasmon-Polariton-Assisted Ramen-Scattering from Adsorbates on Single-Crystal Silver Surfaces," *Rev. Sci. Instrum.* 61(1):27-32.

Charbonneau et al. (Jun. 1, 2000) "Experimental Observation of Plasmon-Polariton Waves Supported by a Thin Metal Film of Finite Width," *Opt. Lett.* 25(11):844-846.

Chilwell et al. (Jul. 1984) "Thin Film Transfer Matrix Theory of Planar Multilayer Waveguides and Reflection from Prism-Loaded Waveguides," *JOSA A* 1(7):742-753.

Cocorullo et al. (2000) "Fast Infrared Light Modulation in a Si:H Micro-Devices for Fiber-to-the-Home Applications," *J. Non-Cryst. Solids* :1247-1251.

Cocorullo et al. (Dec. 15, 1996) "Amorphous Silicon Waveguides and Light Modulators for Integrated Photonics Realized by Low-Temperature Plasma-Enhanced Chemical-Vapor Deposition," *Opt. Lett.* 21(24):2002-2004.

Cutolo et al. (Jul. 14, 1997) "An Electrically Controlled Bragg Reflector Integrated in a Rib Silicon on Insulator Waveguide," *Appl. Phys. Lett.* 71(2):199-201.

de Dood et al. (Jul. 15, 2002) "Amorphous Silicon Waveguides for Microphotonics," *J. Appl. Phys.* 92(2):649-653.

Devaux et al. (Dec. 15, 2003) "Launching and Decouplling Surface Plasmons Via Micro-Gratings," *Appl. Phys. Lett.* 83(24):4936-4938.

Ditlbacher et al. (2002) "Two-Dimensional Optics with Surface Plasmon Polaritons," *Appl. Phys. Lett.* 81(10):1762-1764.

Harke et al. (Dec. 8, 2005) "Low-Loss Singlemode Amorphous Silicon Waveguides," *Electron. Lett.* 41(25):1377-1379.

Homola et al. (1999) "Surface Plasmon Resonance Sensors," *Sens. Actuators B* 54:3-15.

Lamprecht et al. (Jul. 2, 2001) "Surface Plasmon Propagation in Microscale Metal Stripes," *Appl. Phys. Lett.* 79(1):51-53.

Liao et al. (Apr. 18, 2005) "High Speed Silicon Mach-Zehnder Modulator," *Optics Expr.* 13(8):3129-3135.

Liu et al. (Feb. 12, 2004) "A High-Speed Silicon Optical Modulator Based on a Metal-Oxide-Semiconductor Capacitor," *Nature* 427:615-618.

Maier et al. (2001) "Electromagnetic Energy Transport Below the Diffraction Limit in Periodic Metal Nanostructures," *Proc. SPIE* 4456:22-30.

Maier, S.A. (2005) "Plasmonics—Towards Subwavelength Optical Devices," *Curr. Nanosci.* 1(1):17-23.

Nabok et al. (2005) "Total Internal Reflection Ellipsometry and SPR Detection of Low Molecular Weight Environmental Toxins," *Appl. Surf. Sci.* 246:381-386.

Nikolajsen et al. (Dec. 13, 2004) "Surface Plasmon Polariton Based Modulators ad Switches Operating at Telecom Wavelengths," *Appl. Phys. Lett.* 85(24):5833-5835.

Nikolajsen et al. (Feb. 3, 2003) "Polymer-Based Surface-Plasmon-Polariton Stripe Waveguides at Telecommunication Wavelengths," *Appl. Phys. Lett.* 8(5)2:668-670.

Nikolov et al. (May 1, 2000) "Optical Plastic Refractive Measurements in the Visible and the Near-Infrared Regions," *App. Opt.* 39(13):2067-2070.

Ozbay, E. (Jan. 13, 2006) "Plasmonics: Merging Photonics and Electronics at Nanoscale Dimensions," *Science* 311:189-193.

Ritchie, R.H. (1973) "Surface Plasmons in Solids," *Surf. Sci.* 34:1-19.

Salib et al. (2004) "Silicon Photonics," *Intel Technol. J.* 8:143-160.

Sarid, D. (Dec. 28, 1981) "Long-Range Surface-Plasma Waves on Very Thin Metal Films," *Phys. Rev. Lett.* 47(26):1927-1930.

Sciuto et al. (2005) "Miniaturizable Si-Based Electro-Optical Modulator Working at 1.5 µm," *Appl. Phys. Lett.* 86(20):201115.

Smolyaninov et al. (Jul. 15, 1997) "Experimental Study of Surface-Plasmon Scattering by Individual Surface Defects," *Phys. Rev.* B56(3):1601-16111.

Soref, R. (2005) "Silicon Photonics Technology: Past Present and Future," *Proc. SPIE* 5730:19-28.

Soref et al. (Jan. 1987) "Electrooptical Effects in Silicon ," *IEEE J. Quantum Electron* QE-23:123-129.

Soref et al. (1987) "Kramers-Kronig Analysis of Electro-Optical Switching in Silicon," *Proc. SPIE—It. Soc. Opt. Eng.* 704:32-37.

Stegeman, G. (Sep. 1983) "Effects of Gaps on Long range Surface Plasmon Polaritons," *J. Appl. Phys.* 54(9):4841-4843.

Wark et al. (Jul. 1, 2005) "Long-Range Surface Plasmon Resonance Imaging for Bioaffinity Sensors," *Anal. Chem.* 77(13):3904-3907.

Weeber et al. (2001) "Near-Fields Observation of Surface Plasmon Polariton Propagation on thin Metal Stripes," *Phys. Rev. B* 64(4):045411-045411.

Yongqiang et al. (2005) "80-Micron Interaction Length Silicon Photonic Crystal Waveguide Modulator," *Apple. Phys. Lett.* 87(22):221105.

Durfee et al. (2008) "Metal-Oxide-Semiconductor-Compatible Ultra-Long-Range Surface Plasmon Modes," *J. Appl. Phys.* 103(11):113106.

* cited by examiner

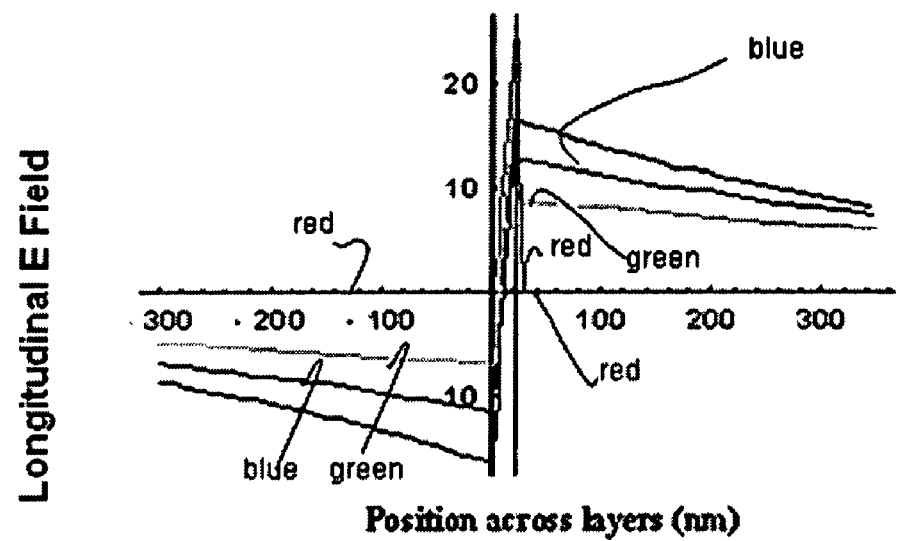
B
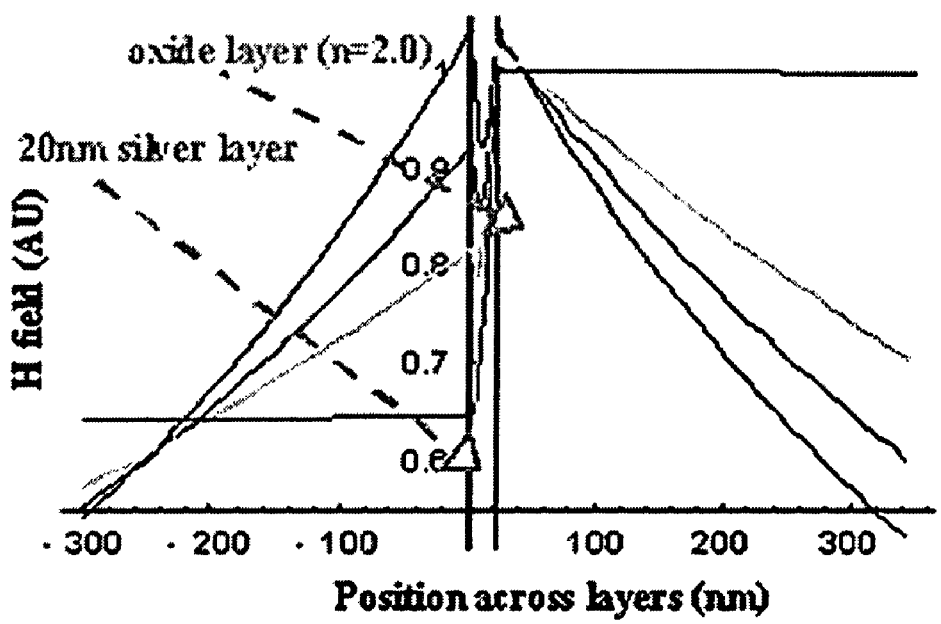
A
FIGURE 2

A
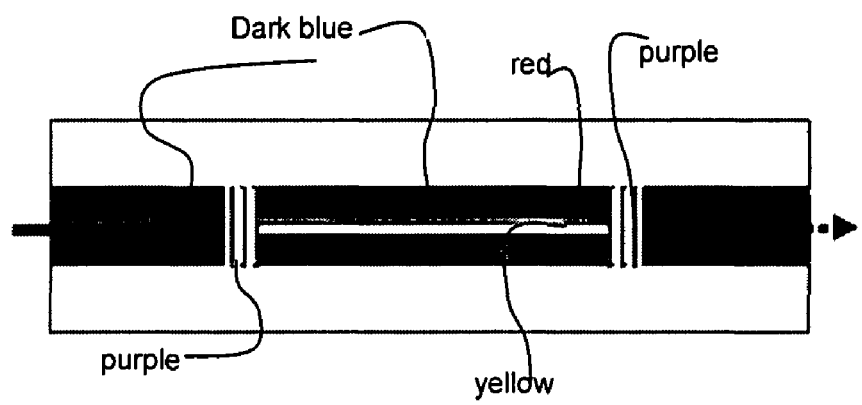
B
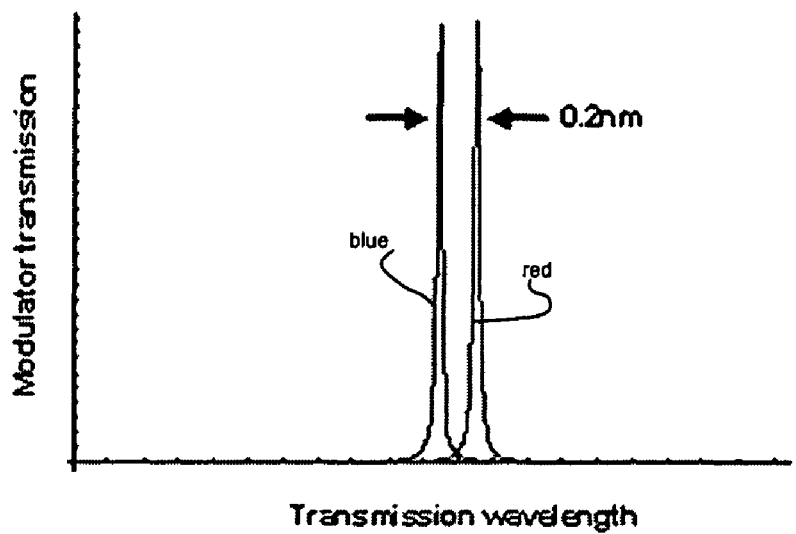
FIGURE 7

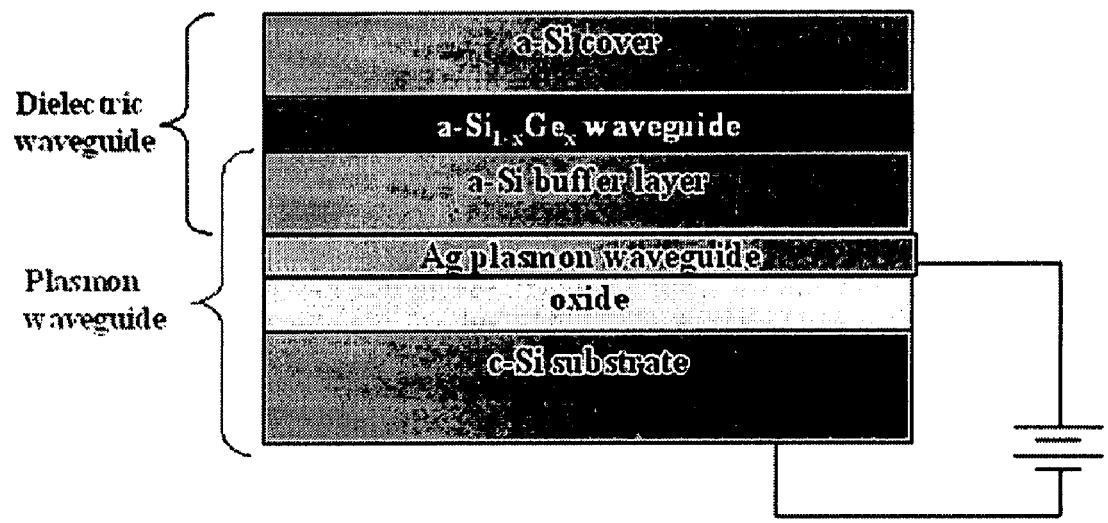
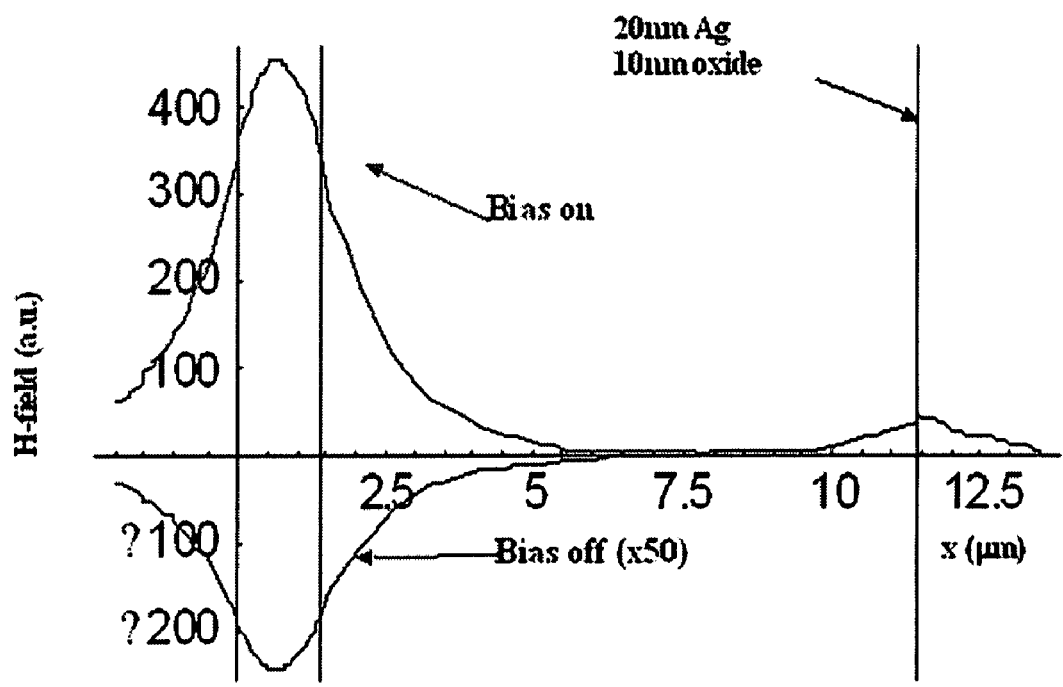
FIGURE 8

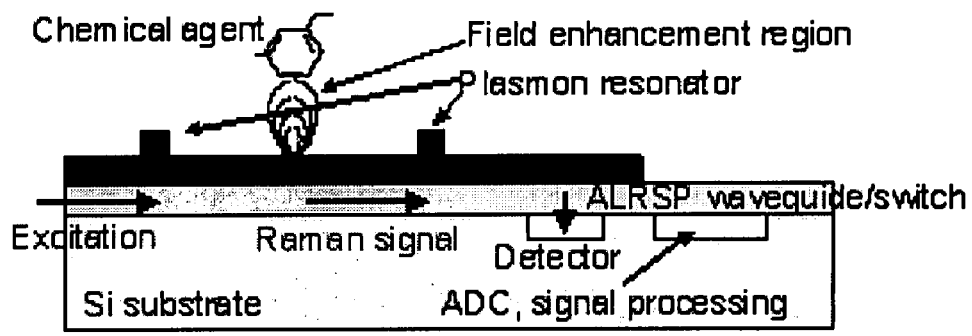
FIGURE 9
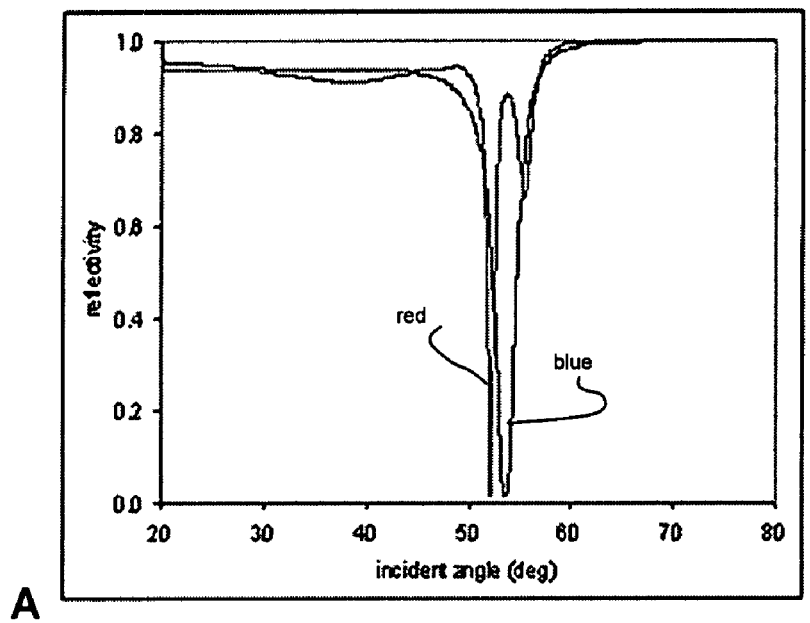
A
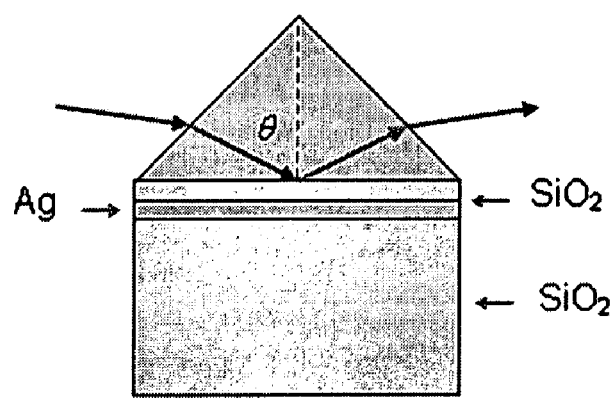
B
FIGURE 10

1) Grow 50nm thermal oxide or PECVD SiN over full substrate

2) Photolithography - wet etch openings in oxide, form Ohmic contact (green) by Al evaporation and lift-off 3) Photolithography - form contact pads (red) on top of oxide by lift-off of Ti/Au

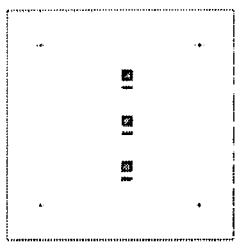
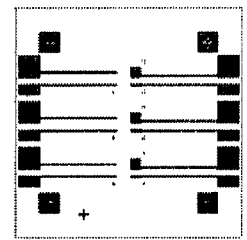

4) Wet etch oxide, deposit Ag over entire chip 5) e-beam lithography - form input and output gratings (blue) by ion milling into Ag

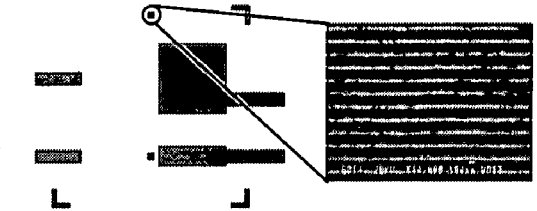

6) deposit SiN/a-Si over the entire central region of the chip 7) e-beam lithography - define waveguide structure, fabricate Ti hard mask by lift-off

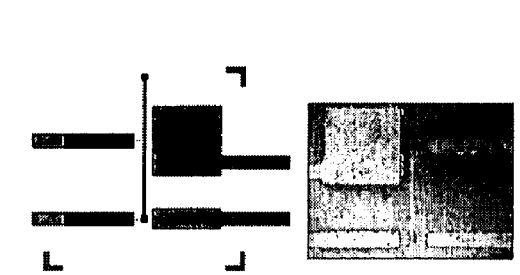

8) Ion mill completely through a-Si and Ag to leave a plasmonic waveguide with integrated Schottky diode

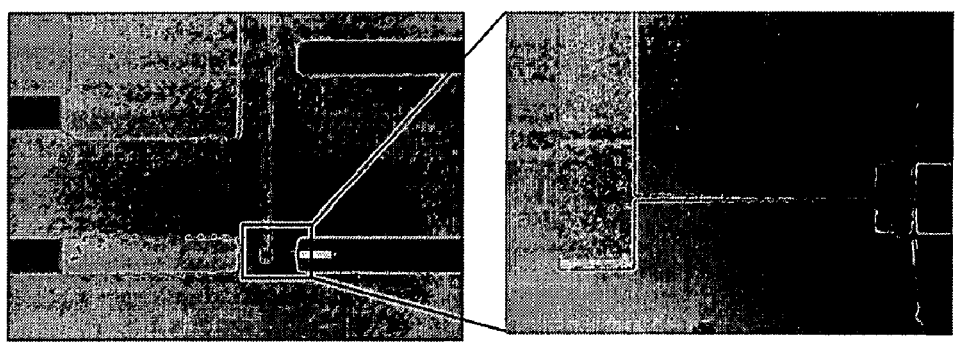

FIGURE 15

SILICON-COMPATIBLE SURFACE PLASMON OPTICAL ELEMENTS

CROSS-REFERENCE TO RELATED APPLICATION

This application claims priority to U.S. Provisional Patent Application No. 60/828,731 filed Oct. 9, 2007, which is incorporated herein by reference to the extent not inconsistent herewith.

STATEMENT REGARDING FEDERALLY SPONSORED RESEARCH OR DEVELOPMENT

This invention was made with government support from the Air Force Office of Scientific Research under Project Nos. FA9550-04-C-0111 and FA9550-06-1-0548. The United States Government has certain rights in the invention.

BACKGROUND

Miniaturization and integration of optical systems analogous to advanced microelectronic technology has been hampered by fundamental and practical limitations. Key among these is diffraction, which limits the confinement of optical fields, and sizes of optical elements, to dimensions comparable to the optical wavelength. In addition, conventional optical components do not lend themselves well to modern thin film integration techniques. Integration of optical elements on a silicon chip analogous to microelectronics technology would have tremendous impact on both optoelectronics and microelectronics industries[1].

Active Si-compatible components such as sources, modulators, switches and detectors are needed if a successful Si-based integrated optoelectronics technology is to be developed. Until recently, however, silicon was not considered a suitable material for optical devices. This is in part due to a low optical efficiency arising from its indirect bandgap and because unstrained silicon does not exhibit an electro-optic effect. Optically active compound semiconductors or electro-optic oxides have been the primary materials explored for electro-optic integration. Unfortunately, after years of development such systems remain costly to manufacture and low in yield. At the same time, there has been a great deal of recent activity demonstrating silicon based electro-optic components[2]. Some particularly exciting work has occurred in the area of silicon based optical modulators. Modulators are an essential "building block" component in any integrated optical circuit.

Because of the absence of an electro-optic effect, Si based modulators often rely on free carrier induced changes to the index of refraction and/or free carrier absorption. This approach has been used to develop electro-optical modulators using, for example, a Si rib waveguide with integrated bipolar mode FET,[3] a lateral p-i-n diode with a Bragg reflector,[4] and MOS capacitors with a Mach-Zehnder interferometer.[5,6] The first of these relies on free carrier induced absorption. In the latter two approaches, a carrier-induced shift in the real part of the index of refraction of a silicon waveguide modulates the intensity. Increasing the free carrier concentration by $10^{19}$ $cm^{-3}$ will reduce the index of refraction[5,7] by about −0.01 and give an absorption coefficient[8] of ~100 $cm^{-1}$. Carrier concentrations of this order were used by Intel to obtain 16 dB (84%) modulation in a Mach-Zehnder interferometer with integrated MOS capacitor phase shifters[5] and more recently to demonstrate 10 Ghz bandwidth.[6]

While devices such as these are interesting for specialty applications, their miniaturization and integration on Si in a manner analogous to advanced microelectronics technology is hampered by fundamental and practical limitations.[9] Key among these is diffraction, which limits the confinement of optical fields, and sizes of optical elements, to dimensions comparable to the optical wavelength. Coupled with this is the small size and spatial extent of free carrier-induced effects. For these reasons, both the Bragg reflector and Mach-Zehnder interferometer require an active region several millimeters long. With Intel's Mach-Zehnder design, for example, the small voltage-induced index change is confined to a narrow layer (~10 nm) adjacent to the oxide surface in an MOS capacitor. This means that only a small portion of the waveguide (and optical field) volume is modulated. In the bipolar field-effect transistor (FET) design, in contrast, reasonable modulation is observed in a 100 µm long modulation region. The power required to obtain sufficient free carrier absorption for modulation in this structure, however, leads to significant heating and/or voltages and currents that are incompatible with conventional Si electronic devices. Without some approach to concentrate optical fields into the region where free carrier densities are modulated, long interactions lengths, high injection current densities, and associated heating are common to most silicon-based modulator designs.[10]

SUMMARY

Surface plasmons (SPs) or, more formally, surface plasmon-polaritons are electromagnetic excitations that exist as the interface between noble metals and dielectrics[11]. Surface plasmon waves can be focused, reflected, guided, and detected much like free space electromagnetic waves, but within planar thin film elements and two-dimensional structures[12]. Plasmon-based waveguide modulators offer the possibility of significant improvements in miniaturization and greater ease of integration with Si.[9] The fields in a plasmon waveguide decay exponentially with distance from the metal surface, so a 10 nm accumulation layer intercepts a much larger fraction of the field than a rib waveguide. This allows plasmon waveguide modulators to be as much as ten times smaller than other reported silicon modulators without the requirement of large carrier injection and associated device heating. We note similar gains in modulation efficiency have been demonstrated in Si-photonic crystal waveguide modulators which also serve to concentrate the fields.[13] Conventional waveguide designs and photonic crystal technology, however, do not always lend themselves to modern thin film integration techniques. Plasmonic elements, by contrast, are fully compatible with thin film processing and nano-patterning techniques.[9] Plasmonic components such as two-dimensional reflectors and interferometers[14,15] lenses and mirrors[16], waveguides[17], and waveguides terminated in focusing elements[18] have been discussed and in many instances demonstrated. Plasmonics, in a very real sense as demonstrated by this invention, is providing an avenue for the integration of optical and electronic functionality on the same chip[19].

Surface plasmon waves can be focused, reflected, guided, and detected much like free space electromagnetic waves, but within planar thin film elements and two-dimensional photonic crystal structures that are compatible with thin film processing and patterning techniques. In addition, lateral dimensions of plasmon optical elements can be considerably smaller than their conventional optical counter parts. Elements such as two-dimensional reflectors and interferometers[20], lenses and mirrors[21], waveguides[22], and waveguides terminated in focusing elements are provided. Plasmonics provides an avenue for the integration of optical and electronic functionality on the same chip.

This invention deals with integrating plasmon optical elements and Si devices on a single chip. Central to the work is development of a new ultra-long-range surface plasmon (ULRSP) waveguide mode recently discovered by our team. This mode exists at the metal-dielectric interfaces in a silicon-oxide-metal-silicon layer structure. As will be understood in the art, the oxide layer can be any insulating layer and the silicon layer can be any dielectric layer. Our modeling has shown that variation in the thickness of the oxide layer can be used to give unprecedented propagation lengths in such structures. Electrically-induced free carrier modulation of the dielectric constant in the Si adjacent to the oxide modulates the waveguide properties allowing novel Si-compatible electro-optic devices to be constructed to route optical power around on a chip in the same manner that switching transistors and interconnects route electric charge on an integrated circuit (IC). These waveguides function as the "wiring" in new classes of optical chips. This invention also integrates ULRSP waveguides and switches with other optical elements to create entirely new classes of hybrid optoelectronic devices for defense applications.

Provided herein are materials, processes, and novel device architectures for surface plasmon-based, complementary metal oxide semiconductor (CMOS)-compatible, optical elements. Emphasis is on a new type of long-range surface plasmon mode in an ultra-waveguide structure (an ULRSP) that we recently discovered, which is particularly well-suited to integration with Si microelectronics.

Computer models are developed for the electromagnetic fields in metal dielectric waveguide structures which support surface plasmons. These models are used to explore the basic science of plasmonic systems, to assist in interpretation of experimental results, and to predict and test designs which support ULRSPs in Si-compatible configurations and in visible wavelength analogs. Simulations determine the optical configurations for modulation of ULRSP modes by free carriers electrically induced in silicon layers located near the plasmon supporting metal film.

Basic materials science and fabrication techniques required to realize novel plasmonic optical elements are also provided. Nanopatterned array couplers are designed, fabricated in metal films using Near-Field Scanning Optical Microscopy (NSOM) and e-beam lithography, and characterized optically. Dielectric layers of polymers, oxides, a-Si, and a-Si alloy layers are deposited, characterized, and optimized for low loss performance in plasmon waveguides. (Standard chemical symbols are used herein to represent chemical elements and compounds.)

Using designs from the modeling and the above fabrication techniques, planar, visible wavelength analog test structures that which illustrate plasmon modes and particularly ULRSP modes are fabricated. Using these structures fundamental properties of ULRSPs are characterized including propagation and coherence lengths, losses, temporal evolution, and field intensities. Visible wavelength-coupled dielectric waveguide/surface plasmon structures are used to isolate plasmonic effects in easily-measurable configurations. Test structures that illustrate free carrier modulation effects and coupling of conventional and ULRSP waveguide modes are constructed and studied. The goal is to provide fundamental information necessary for the design of active Si-based devices and also information to be fed back into modeling.

The visible wavelength results are extended to Si substrates and telecommunications wavelengths. We explore how the properties of ULRSP modes change, and what material and processing modifications must be made, to shift from low dielectric constant substrates (e.g., glass) to Si. Initial work investigates individual components required to fabricate silicon-based ultra-plasmon waveguides and modulators. Dispersion relations, phase information, and propagation lengths are measured as a function of structural parameters such as layer thicknesses and composition of the metal film. Finally, individual elements are integrated into telecommunication wavelength waveguide and modulator structures. This work is heavily guided by modeling activities that have undergone extensive validation by visible wavelength test structures.

By taking advantage of the mature processing and manufacturing expertise silicon technology affords, smaller and more highly integrated optical subsystems can be mass produced at low cost for telecommunications applications. The ability to integrate electronic and optical components on the same silicon platform allows, for example, high data rate optical interconnects to replace copper wiring at critical communication bottlenecks and, ultimately, everywhere on a new generation of high speed processors. In addition to the impact on existing technologies, the hybrid silicon-based optoelectronic technology of this invention enables entirely new civilian and military applications such as chemically-selective, single-molecule detectors on a chip.

This invention provides a modulator for varying an optical signal by varying an electrical signal or varying an electrical signal by varying an optical signal. The modulator comprises: an ultra-long-range surface plasmon (ULRSP) waveguide; and an optical waveguide coupled to the ULRSP waveguide.

In an embodiment, the ULRSP waveguide comprises: a metal layer; a first dielectric layer adjacent to one side of the metal layer; an insulating layer adjacent to the other side of the metal layer; and a second dielectric layer adjacent to the insulating layer. In one embodiment, the ULRSP waveguide is a metal-oxide semiconductor (MOS) capacitor. The metal layer is typically about 20 to about 30 μm thick. The metal layer can comprise a metal selected from the group consisting of silver, gold, copper, and aluminum. The insulating layer can be an oxide layer, and can be about 10 to about 20 nm thick. It is desirable that the difference in the indices of refraction on either side of the metal layer is no more than about 0.1.

In another embodiment, the ULRSP waveguide comprises: a first dielectric layer having a high refractive index; an insulating second dielectric layer having a low refractive index adjacent to said first dielectric layer; a metal layer adjacent to said second insulating dielectric layer; an insulating third dielectric layer having a low refractive index adjacent to said metal layer; and a fourth dielectric layer having a high refractive index adjacent to said insulating third dielectric layer.

The optical waveguide can be a visible-light or infrared-light optical waveguide. The infrared-light optical waveguide can be a portion of a MOS capacitor.

The optical waveguide can be a dielectric waveguide and the ULRSP waveguide can share a dielectric silicon layer with the dielectric waveguide.

The modulator can be combined with means for inducing a selected voltage across said capacitor, whereby light in the optical waveguide is modulated by changes in the voltage across said capacitor. Means for inducing such voltage are known to the art.

In one embodiment of the modulator of this invention, the wavevector of the light in the optical waveguide matches that of the surface plasmon.

The modulator can comprise a silicon-compatible optical waveguide with an embedded ULRSP waveguide contained in a linear Fabry-Perot resonator with Bragg mirrors.

The modulator can be incorporated into a chemical detector or a computer processor.

BRIEF DESCRIPTION OF THE FIGURES

FIG. 2: A. Mode profiles for Re[H] for transverse magnetic (TM) surface plasmons on a 40 nm Ag film and different oxide thicknesses (n=2.5). Blue: no oxide (conventional symmetric LRSP mode), Red: 10 nm oxide, Black: 20 nm oxide. B. Electric field (EM) profiles.

FIG. 7: A. Schematic of a waveguide Bragg resonator with an embedded ULRSP modulator, made up of a dielectric core/cladding (dark/light blue), Ag (red), oxide (yellow), and Bragg reflectors (purple). B. Transmission of modulator with bias on and off.

FIG. 8: Vertical schematic of coupled plasmon and dielectric waveguides (top) and the modeled effect of an inversion layer on field coupling between the two (bottom). As shown in the top image of FIG. 8, the dielectric waveguide includes an a-Si cover layer, a-Si buffer layer, and a-$Si_{1-x}Ge_x$ dielectric core layer located between the cover and buffer layers. The plasmon waveguide shares the a-Si buffer layer with the dielectric waveguide and also includes an Ag plasmon waveguide layer, an oxide layer and a c-Si substrate, with the Ag and oxide layers being located between the buffer layer and the substrate.

FIG. 9: Schematic of an integrated molecular detector chip. Optical energy in the ULRSP waveguide is switched into and concentrated by a plasmon resonator. Raman shifted signal is recoupled, detected, and processed.

FIG. 10: A. Test structure designed to examine the characteristics of visible wavelength LRSPs. B. A WVase-32 calculation of the experimental reflectivity: 300 nm spacer, 100 nm Ag layer. 400 nm spacer, 60 nm Ag layer. The symmetric (LRSP) mode appears at the smaller incident angle.

FIG. 15: Simplified process flow for an ULRSP with integrated Schottky diode.

DETAILED DESCRIPTION

Figure 1:
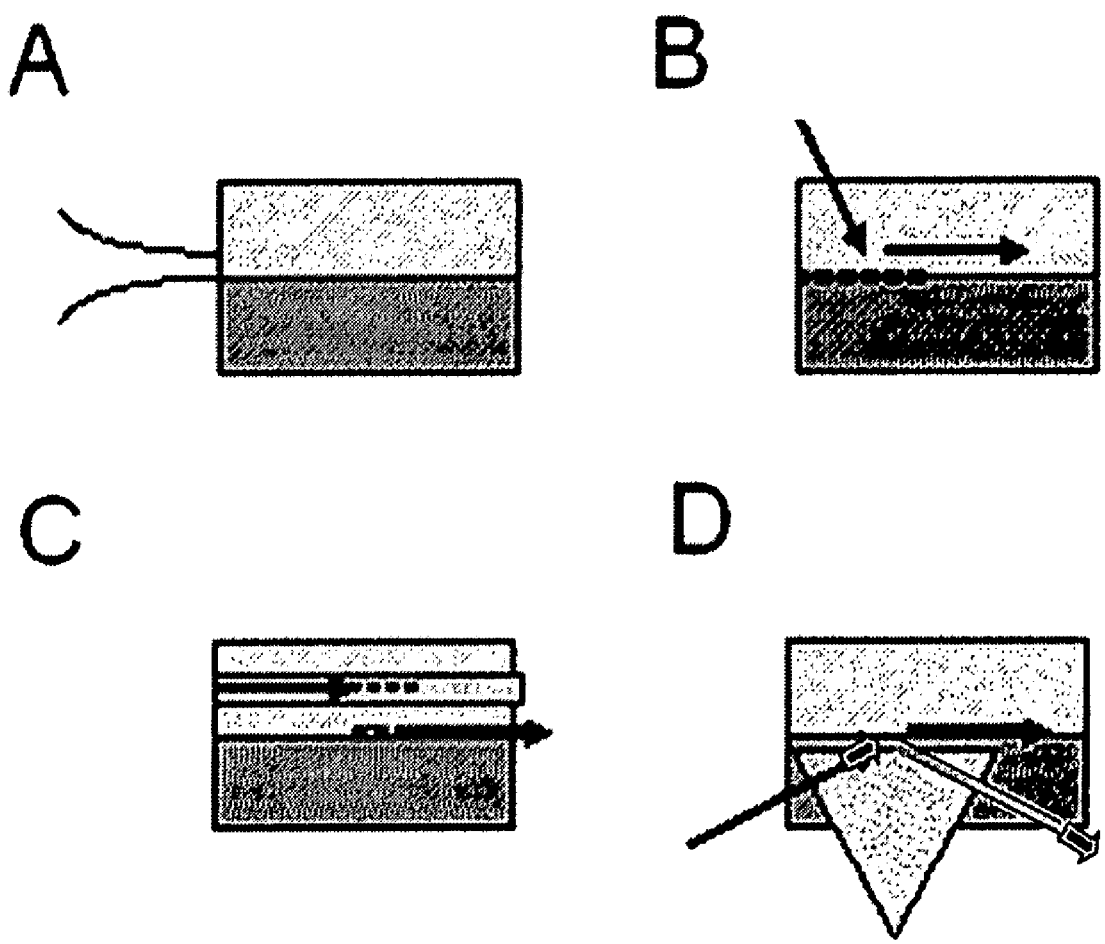
FIG. 1: Schematic illustration of some mechanisms to couple light to surface plasmons. a) end-fire, b) grating, c) waveguide mode matching, and d) prism coupling.

This invention provides methods and devices for integrating long-range surface plasmon waveguides into Si-compatible devices. A conventional long-range surface plasmon waveguide is formed by sandwiching a 20-30 nm thick metal stripe waveguide between two dielectric layers. The plasmons on both surfaces of the metal couple in asymmetric and symmetric modes when the index of refraction of the two dielectric layers is nearly the same and the metal is sufficiently thin. The electric field strength inside the metal is nearly zero for the mode symmetric in the H-field, allowing for propagation lengths to be hundreds of microns. We have discovered that the asymmetric introduction of a thin, lower-index dielectric (e.g., oxide) layer adjacent to the metal film on one side dramatically increases the range of the long-range plasmon mode as discussed below. This allows construction of a unique modulator in which the oxide layer functions as the gate of a MOS capacitor in a silicon substrate. Voltage modulation of the free carrier density below the gate leads to index and absorption modulation of the waveguide output.

Active Si-compatible components such as sources, modulators, switches and detectors are needed if a successful Si-based integrated optoelectronics technology is to be developed. Since silicon does not exhibit an electro-optic effect, silicon based optical modulators often rely on free carrier-induced changes to the index of refraction and/or free carrier absorption. Electro-optical modulators based on more conventional approaches have been demonstrated in Si using a lateral p-i-n diode with a Bragg reflector[23] and MOS capacitors with a Mach-Zehnder interferometer.[24] Both of these approaches rely on a carrier induced shift in the real part of the index of refraction of a silicon waveguide to modulate the intensity. The transmission of the Bragg reflector is modified by the index shift allowing up to 50% reduction in peak transmission. The relative phase through the two legs of the Mach-Zehnder interferometer is changed allowing an 85% reduction in peak intensity and greater than 1 GHz modulation speed. Increasing the free carrier concentration by $10^{19}$ $cm^{-3}$ reduce the index of refraction[5] by about −0.01 and give an absorption coefficient[25] of ~100 $cm^{-1}$. Carrier concentrations of this order were used by Intel to obtain 16 dB (84%) modulation in a Mach-Zehnder interferometer with an integrated MOS capacitor phase shifter.[5] Both the Bragg reflector and Mach-Zehnder interferometer require an active region several millimeters long due to the small change in index that can be obtained, and also because only a small portion of the waveguide volume is modulated. The accumulated charge resides in a narrow layer (~10 nm) adjacent to the oxide surface in a MOS capacitor. By contrast, the fields in a plasmon waveguide decay exponentially with distance from the metal surface, so a 10 nm accumulation layer would intercept a much larger fraction of the field than a rib waveguide. This allows plasmon waveguide modulators to be as much as ten times smaller than other reported silicon modulators.

Surface plasmons are quantized electron density oscillations in the surface of a metal. If the boundary is flat, the excitation is a wave that propagates parallel to the interface, penetrating into the metal by a distance no more than the Thomas-Fermi length (about 0.1 nm). This wave is coupled to a surface electromagnetic (EM) wave that also propagates parallel to the interface with fields that are confined to the interfacial region on both sides of the boundary. The field strength is maximum at the interface and decays exponentially on both sides. A thin metal film sandwiched between dielectric materials supports surface plasmon modes that involve both of its interfaces.[26] The result is a pair of hybridized surface plasmons with different field distributions within the metal. The asymmetric mode (in the E-field) has an imaginary part of the surface plasmon wavevector, $k''_{sp}$, that is much smaller than the symmetric mode, leading to much longer propagation lengths. These well known long-range surface plasmons (LRSP) can propagate hundreds of microns and are useful excitations in plasmonic waveguides.

For modeling of waveguide structures, we have developed a computer code for calculating the propagation of trapped waves in a planar multilayer structure. A transfer matrix connects the two E and H fields at either side of an interface. The nature of this matrix depends on whether the field is TE or TM. The behavior of a given multilayer structure, specified by a sequence of thicknesses and refractive indices, is then described by a product of each layer matrix. The imposition of the condition that the fields are damped in the sub- and superstrate regions yields an eigenvalue equation for the allowed transverse wavenumbers. In the case where all the materials possess real refractive indices, the real roots of this equation correspond to the guided modes of the structure. With the known roots, the field patterns throughout the structure are then calculated. Surface plasmons, of course, require materials with a complex refractive index, and we have implemented a routine to find the resulting complex roots.

Figure 16:
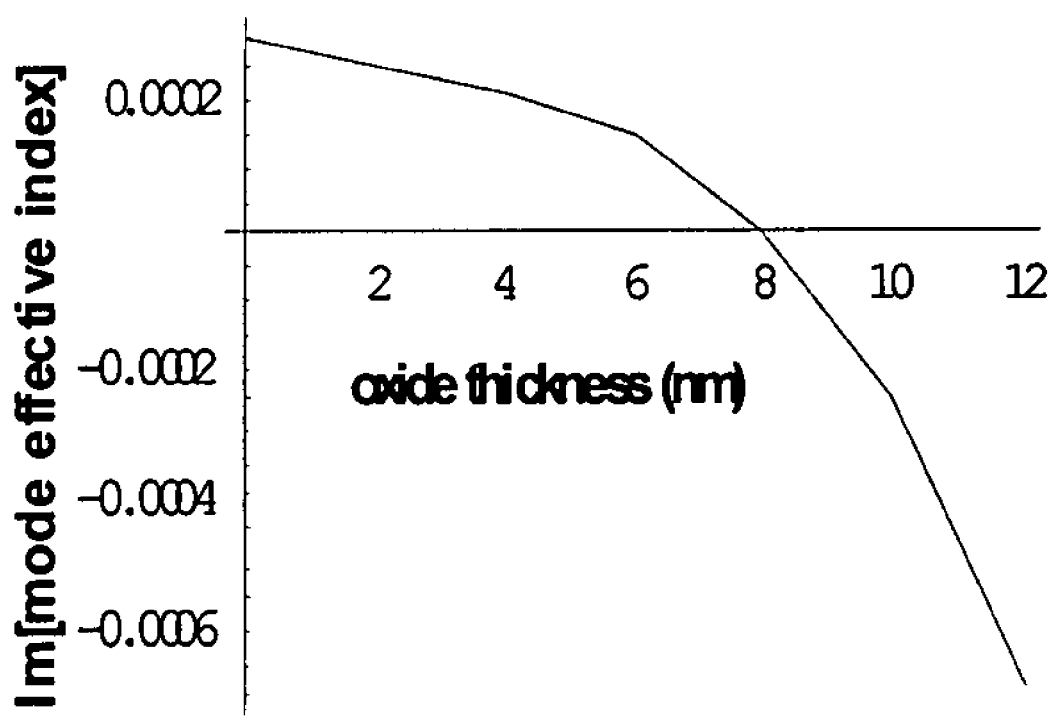
FIG. 16: Imaginary part of waveguide mode index of the asymmetric waveguide structure as a function of oxide thickness.
Figure 17:
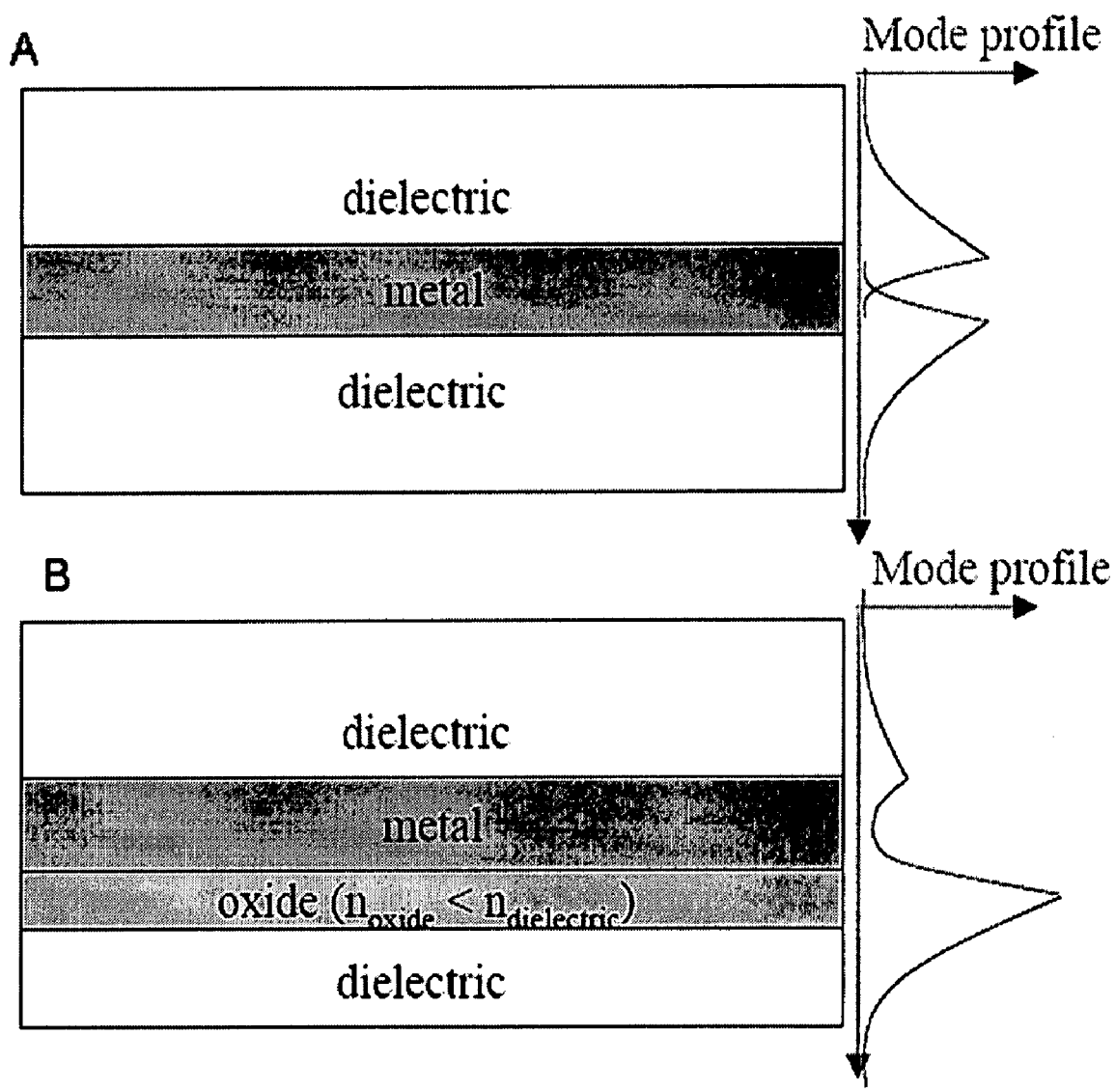
FIG. 17: A. Conventional Long Range Surface Plasmon (LRSP) configuration and mode profile for this configuration; B. Ultra-Long Range Surface Plasmon (ULRSP) configuration and mode profile for this configuration.
Figure 18:
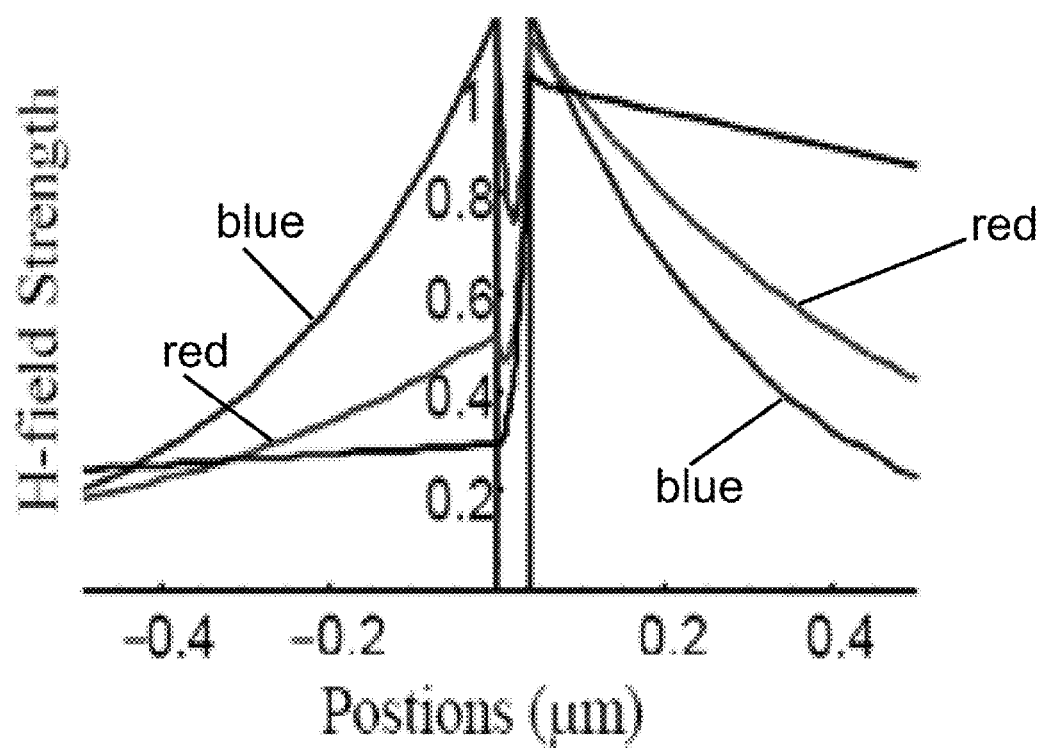
FIG. 18: Effect of oxide thickness on ULRSP propagation. Effect of oxide thickness on mode profile.

The presence of an insulating layer next to the conducting layer is an important component of the electronic devices for use in active, Si-compatible, optical modulators, yet a strong refractive index asymmetry can put the long-range surface plasmon modes beyond cutoff if this layer thickness is too large. This observation was made by Stegeman et al (G. Stegeman, J. Appl. Physics, vol 54, p 4841 (1983)), who considered the addition of a low-index layer (air) between the metal and the surrounding dielectric. They incorrectly concluded that the low-index layer would always prevent the existence of guided modes. Here, we show that with careful control of the index and layer thickness, the mode will propagate with reduced loss. FIG. 2 shows the results of our model of 1.5 μm light propagating in a structure with a thin oxide layer next to a 20 nm silver conductor, surrounded by silicon. The black curves show the mode fields without the insulator, i.e., the previously known conventional LRSP mode. As the insulator thickness is increased to 8 nm the decay length of the fields extending into the Si increases and the field in the metal film decreases, corresponding to reduced ohmic loss for the mode. The mode thus makes a smooth transition from bound to radiative. This is illustrated in FIG. 16, where the imaginary part of the effective mode index β, which is related to the damping coefficient: $\alpha = k_0 \text{Im} \beta$, is plotted. The insulating layer, with its lower index, actually increases the range of the long-range surface plasmon mode. As the "cutoff" condition is approached, the losses go to zero, and the intrinsic propagation range of the mode goes to infinity. In reality surface roughness and radiative losses place an upper bound on the propagation length, but such a mode is expected to have a much longer range than conventional LRSPs. For oxide thickness greater than 8 nm (for these conditions), the mode is radiative. We find in our numerical testing that this effect also occurs at visible wavelengths as well.

Modulators based on plasmon devices are fabricated in several ways. A simple modulator is formed by creating a Schottky diode, a lateral p-i-n diode, or a metal-oxide-semiconductor (MOS) capacitor along a plasmon stripe waveguide formed directly on a silicon substrate. Forward or reverse biasing of the device introduces or removes free carriers near the metal-semiconductor interface locally changing the complex index of refraction. Free carrier absorption or associated changes in dispersion during forward bias operation modulates the optical signal. This structure is useful for short-range transmission of signals over distances of a few hundred microns. A long-range plasmon waveguide is formed by creating a multilayer plasmonic structure. These transmit signals over several hundred microns with the same modulation capability. A short plasmon waveguide section under an amorphous silicon rib dielectric waveguide is constructed as essentially shown in FIG. 1. Varying the bias on the plasmon waveguide changes the coupling between the plasmon and silicon rib waveguides. Minimizing the coupling allows light to travel unimpeded down the silicon rib waveguide. Maximizing the coupling transfers energy into the plasmon waveguide where it is attenuated by Ohmic losses in the metal. Other device configurations are also provided, such as these structures fabricated on one leg of a Mach-Zehnder interferometer. The carrier-induced change in the silicon index of refraction is used to change the relative phase in the two legs, allowing intensity modulation by interference rather than absorption.

Surface Plasmons

Surface plasmons are quantized electron density oscillations in the surface of a metal.[27] If the boundary is flat, the excitation is a wave that propagates parallel to the interface, penetrating into the metal by a distance no more than the Thomas-Fermi length (about 0.1 nm). This wave is coupled to a surface electromagnetic (EM) wave that also propagates parallel to the interface with fields that are confined to the interfacial region on both sides of the boundary. The entire phenomenon can be described through the EM picture, since the associated fields must be consistent with the dielectric properties of the system, which include the detailed behavior of the electrons.

General Characteristics

The wavevector of the surface electromagnetic wave (SEW) on a planar interface between a material with a complex dielectric function $\epsilon_m = \epsilon'_m + i\epsilon''_m$ and air is $$k_{sp} = k'_{sp} + ik''_{sp} = \frac{\omega}{c}\sqrt{\frac{\epsilon_m}{1+\epsilon_m}} \quad (1)$$

where ω is the SEW frequency and c is the speed of light. Surface plasmons are possible when $\epsilon'_m$ is negative and $\epsilon''_m$ is small, a condition satisfied in noble metals in an appropriate range of frequencies.[28] In an ideal, high-density free electron gas, $\epsilon_m$ is real and negative, and there are no propagation losses. Among real metals, silver ($\epsilon_m \approx -134 - 3.4i$ at λ=1.5 μm) is one of the materials with the most favorable properties for propagation of SP waves in the visible and near-IR. Silver is uniquely suited for supporting surface plasmons, because of its unusual optical properties. Aluminum, gold and copper are also favorable for the propagation of surface plasmons.

The surface plasmon transports energy with a propagation length of $l_{sp}=1/(2k''_{sp})$ (2) which is of the order of 10-200 μm in silver on a metal-air interface. The attenuation length increases as the wavelength increases into the near IR. Attenuation lengths are limited by $\in''_m$, which is related to relaxation channels such as interband transitions and electron scattering. We initially focus on use of Ag and Au films. However, estimates of attenuation lengths at the 1.5 μm telecommunications wavelength suggest Cu films also have sufficiently low attenuation to be used in the devices proposed here. Al is also useful. The ability to use Cu or Al increases compatibility with existing VLSI processing since both are routinely used in Si electrical interconnects.

Energy Coupling

A major issue in using plasmons is efficient coupling of energy into and out of the excitation. Since the SP modes are TM waves, the incident radiation must share that polarization. Surface plasmons on flat boundaries are waves that are bound to the surface with an evanescent character in the dielectric. They cannot be directly excited by incident light and they are nonradiative. The reason is that $k_{sp}$ has a value greater than that of a free space wave in the dielectric. For example, in air the size of the component of an incoming wavevector that is parallel to the interface is $k_\parallel=(\omega/c)\sin\theta$ (where θ is the angle of incidence), which is smaller than ksp for any value of θ. There are several ways to couple energy into and out of surface plasmons: endfire, grating, prisms, waveguides and direct electrical excitation (see FIG. 1).

Direct coupling from free space or from a fiber (end-fire coupling is shown in FIG. 1A. The surface c imprinted with a grating is shown in FIG. 1B, so that radiative coupling occurs at $k_\parallel - k_{sp} = \pm\pi p/a$, where a is the spatial period of the grating and p is an integer. Essentially, one of the diffraction orders is coupled directly into the evanescent wave. The coupling phenomenon can also be viewed as mode matching where the propagating EM wave has within its mode structure (its set of k‖ values for each contributing ω) modes equal to those of the surface plasmon for that range of ω. As discussed below, we use periodic structures patterned into metal films to allow optical coupling to ALSRP waveguide structures.

In another approach the metal is deposited on a dielectric with an index of $n_b$ (prism coupling, FIG. 1C). Light incident from the dielectric side has a wavevector whose parallel component, $k_{\parallel b}=(n_b\omega/c)\sin\theta_b$, is matched to ksp by adjusting the angle of incidence.[29] If the metal film is thin, electromagnetic energy tunnels through from the dielectric to the free surface where wavevector matching enables excitation of the surface plasmon. In the studies discussed below to demonstrate ULRSP waveguide modes and characterize fundamental properties at visible wavelengths, we frequently use prism coupling.

Mode matching is also arranged between a surface plasmon waveguide and a nearby conventional waveguide (FIG. 1D). Here the waveguide is designed to have a modal wavevector that matches that of the surface plasmon. Placing the two structures nearby allows the modes to be mixed and split into symmetric and antisymmetric combinations, ($k_s$, $k_a$). Power injected into the waveguide mode is a linear combination of these two modes, and power is transferred from the dielectric guide to the SP mode over a distance $L_t=\pi/|k_s-k_a|$. This scheme is the most attractive for integrating optics and electronics on the same chip.

Another interesting approach to plasmon excitation involves using energetic electrons (with fields appropriate to a point charge) which can directly couple to any type of surface plasmon.[30] Most of the present study is directed at coupling light into and out of ULRSP waveguides. Electronic excitation, however, is an effective way to directly pass signal between conventional electronic devices and plasmonic devices which simplifies on-chip integration. This approach is also discussed.

Ultra-Long-Range Surface Plasmons

To understand the nature of the ultra-long-range surface plasmon (ULRSP) mode, it is instructive to consider again the nature of the losses in conventional SP modes. The simplest form of a surface plasmon polariton mode is a transverse magnetic (TM) mode at a single metal-dielectric interface. In addition to the transverse electric field that is directed across the interface, there is a longitudinal component that drives surface currents with ohmic losses. A more general expression for the propagation constant of the single-interface SP wave is $$k_{sp} = \frac{\omega}{c}n_{sp} = \frac{\omega}{c}\sqrt{\frac{\varepsilon_d\varepsilon_m}{\varepsilon_d+\varepsilon_m}}, \quad (3)$$

where $\in_d$ and $\in_m$ are the complex dielectric constants of the dielectric and the metal, respectively, and $n_{sp}$ is the effective index of the mode. In this form, Eq. 2 for the propagation length becomes $l_{sp}=c/2\omega\text{Im}(n_{sp})$. The dielectric also has a large influence on propagation. For Ag-air at 1.5 μm, $l_{sp}=1.2$ mm, but for an Ag—Si interface (n≈35), the propagation distance is much less, $l_{sp}=25$ μm. Qualitatively, the higher field strength in the dielectric drives a larger surface current, resulting in greater ohmic losses.

A conventional LRSP waveguide is formed by sandwiching a thin ($d_{Ag}$=20-30 nm) metal layer between two dielectric layers. The plasmons on both surfaces of the metal couple when the index of refraction of the two dielectric layers is nearly the same and the metal is sufficiently thin. For the mode symmetric in the H-field, the longitudinal electric field is antisymmetric, and the field strength inside the metal is nearly zero, allowing for a greatly increased propagation length.[31] At $d_{Ag}$=20 nm in silicon, $l_{sp}$=400 μm for this mode.

The presence of an insulating layer next to a conducting layer is an essential component of the electronic devices, e.g., Metal Oxide Semiconductor Field Effect Transistor (MOSFET), to be integrated into active, Si-compatible, optical modulators. The conventional LRSP can tolerate only small index differences on opposing sides of the metal (Δn<0.1). Since known dielectrics have an index that is substantially lower than that of Si, the strong asymmetry would generally be expected to suppress the existence of long-range surface plasmons. We have discovered that if the insulator layer is sufficiently thin, not only can the SP mode exist with large index differences (Δn>1), it propagates with an lsp greater than that of the conventional LRSP. FIG. 2 illustrates the mode profiles for the different long-range SP modes, for a vacuum wavelength of 1.5 μm in a structure with a 40 nm silver conductor surrounded by silicon. The modes were calculated with a matrix multilayer EM code that we have adapted for complex mode solutions[32].

The blue curves (originating at the highest point on each side of the interface) in FIG. 2 shows the mode fields without the insulator, i.e., the conventional symmetric LRSP mode. As the insulator thickness is increased to 10 nm the field falls off less quickly into the Si on both sides, while the amplitude near the metal surface decreases strongly on the side opposing the insulator layer. Along with these modal changes, there is an increase in the propagation length from lsp=77 μm to lsp=92 μm. A further increase in the insulator thickness to 20 nm increases the propagation length to 375 μm. This increase in propagation length arises from a reduction in the electric field strength inside the metal film, resulting in a reduced ohmic loss for the ULRSP mode. As the "cutoff" condition is approached, the losses actually go to zero, and the intrinsic propagation range of the mode goes to infinity. The insulating layer, with its lower index, actually increases the range of the long-range surface plasmon mode.

Figure 3:
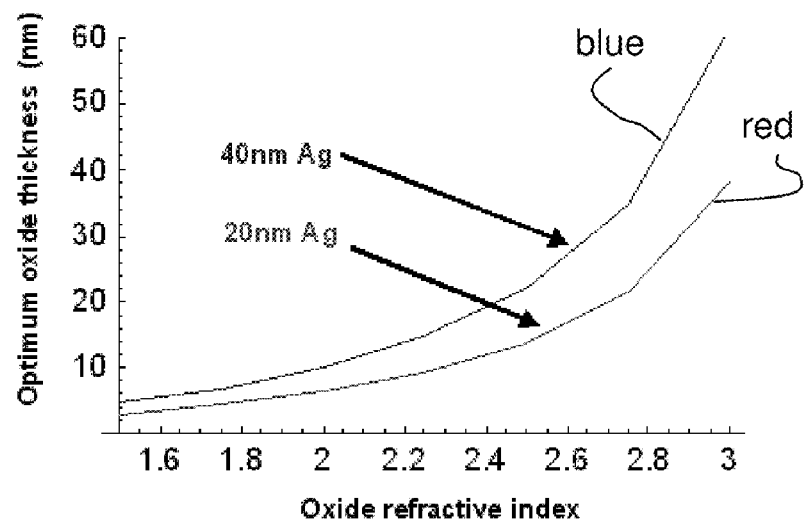
FIG. 3: Calculated oxide thickness required to produce an ULRSP mode with a propagation length of 1 mm, as a function of the oxide refractive index. Curves are shown for 20 nm and 40 nm Ag layer thicknesses.
Figure 4:
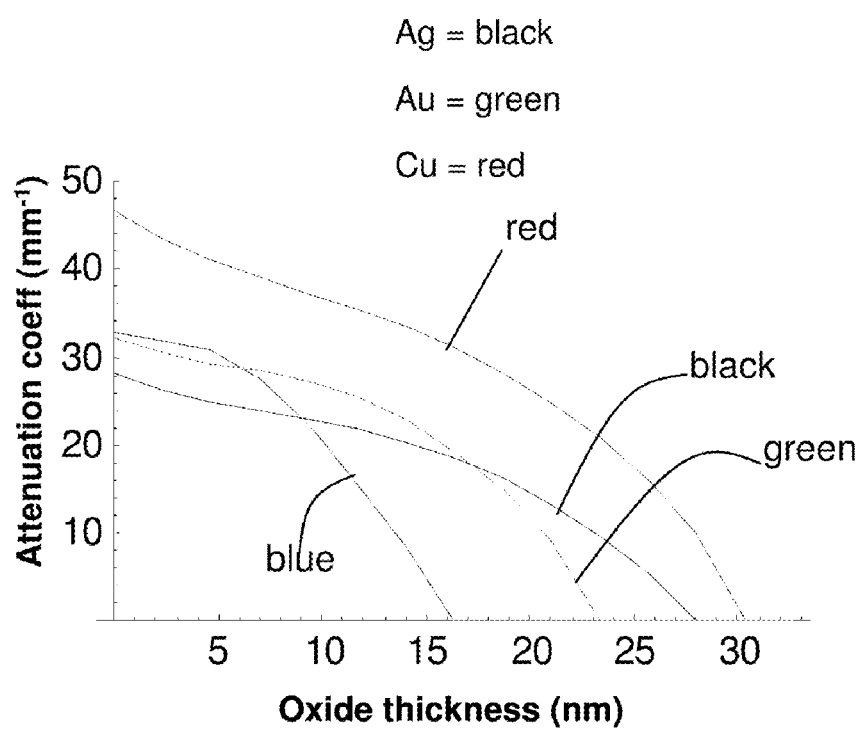
FIG. 4: Power extinction coefficient vs oxide thickness at $\lambda=1.5$ µm for several metals that support SP propagation. Oxide thicknesses that are greater than cutoff (the intersection with the x-axis) do not support bound SP modes. The metals are red: copper, black: silver, green: gold, blue: aluminum. The oxide index is n=2.5.

FIG. 3 illustrates the dependence of the ULRSP on the refractive index of the insulator (typically an oxide). The oxide thickness is adjusted for a constant propagation length (arbitrarily chosen here to be 1 mm). It can be seen that the required oxide thickness decreases with the oxide refractive index. While the low index oxides require thickness <10 nm, our calculations indicate that it is the asymmetry of the structure that is most important—if at n=1.5 a 3 nm layer is required, a layer on both sides of the metal of 10 nm and 13 nm also works. The ULRSP modes work with a variety of metals that support surface plasmons. FIG. 4 shows the variation of the power extinction coefficient 1/lsp with oxide thickness (n=2.5) for Ag, Au, Cu and Al at a vacuum wavelength of 1550 nm. This figure illustrates that even if a metal such as copper is only moderately favorable for conventional SP propagation, it can be made to propagate ULRSP modes with low attenuation. In reality surface roughness and radiative losses place an upper bound on the propagation length, but such a mode has a much longer range than conventional LRSPs.

Figure 5:
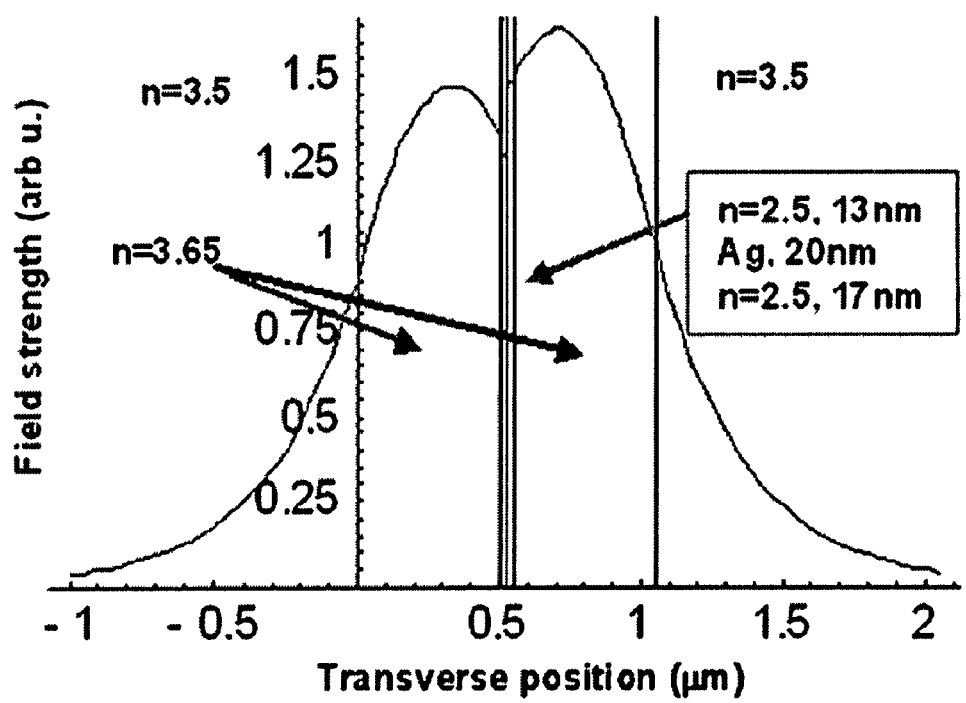
FIG. 5: Illustration of the mode profile for an oxide-metal-oxide structure embedded within a conventional waveguide. The propagation length for this waveguide is 1 mm.

As the propagation length increases, the extent of the evanescent wave into the surrounding dielectric increases. This effect is of the same origin as in the conventional LRSP, where the propagation length is increased by thinning the metal layer. We can compare the spatial distribution of LRSP and ULRSP modes of the same propagation length. Our calculations show that the use of the low index layer to extend the propagation length (ULRSP) compared to reducing it by thinning the metal (LRSP) gives a mode that is of the same order of magnitude in size, but somewhat larger. This mode size increase is lessened by using a higher refractive index for the oxide layer, or by distributing the low index across both sides of the metal. Further spatial localization of the mode can be accomplished in a number of ways. As an example, FIG. 5 illustrates a metal-oxide layer embedded in the center of a dielectric slab waveguide. Here, a double oxide layer is used to improve the propagation length (~1 mm in this case). Clearly the parameter space available for design is large. Another observation is that a low-index layer also improves the SP propagation length in the limit of a semi-infinite metal. Thus the mode can be confined with parallel strip waveguides.

Our modeling shows that ULRSPs occur at visible wavelengths as well. The properties of the metals are not as favorable for SP modes, but the dielectric materials have lower refractive index and offer a greater number of choices. This allows the properties of the ULRSP modes to be exploited in that range. Furthermore, many of these devices can be extended to the mid-infrared (IR) and long-wave IR. In fact the degree of modulation due to free carrier injection is much greater at these wavelengths.

Modulator Designs

Figure 6:
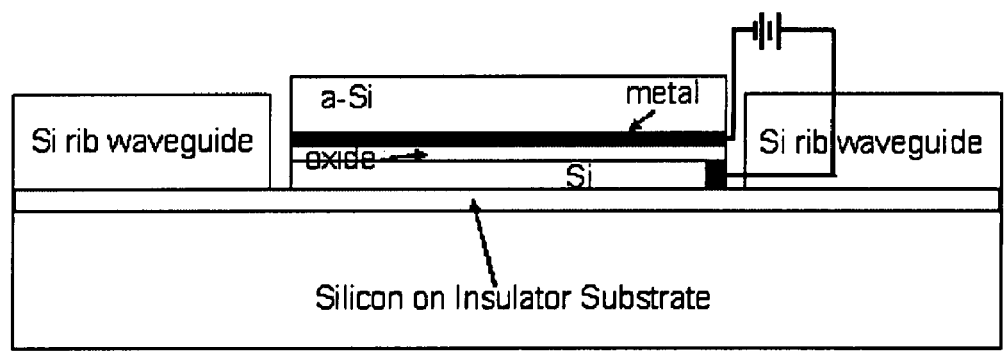
FIG. 6 Schematic of an ULRSP waveguide modulator inserted into a Si rib waveguide. Electrical modulation of the charge of the metal-oxide-Si interface modulates optical transmission through the plasmon waveguide.

The existence of ULRSP modes allows a unique modulator design in which the oxide layer functions as the gate of a metal-oxide semiconductor (MOS) capacitor on a silicon substrate. Voltage modulation of the free carrier density below the gate leads to index and absorption modulation of the waveguide output. FIG. 6 illustrates a zeroth order approach to making an integrated plasmon-based modulator. Biasing the metal-oxide-Si structure introduces free-carriers into the Si layer which change the effective index of the region of the Si/oxide layers. Lateral pn junctions straddling the ULRSP waveguide in FIG. 6 are also used to inject the carriers and modulate the Si index. If the ULRSP guide is operated near the cutoff shown in FIG. 4, the losses are modulated by the applied voltage. Here an ULRSP stripe modulator is inserted in-line with a silicon rib waveguide. A photonic crystal waveguide is also used. In this case, the conventional waveguide is end-fire coupled to the modulation element. End-fire coupling has previously been demonstrated for conventional LRSP waveguides.[33] The ULRSP modulator itself uses a-Si capping layer to create an approximate index match in the regions above the metal and below the oxide. Losses in the a-Si can be a concern. By tailoring, however, the layer properties through growth parameters such as temperature and hydrogen content, very low loss a-Si waveguides are made at 1.3 and 1.5 μm telecommunications wavelengths.[34,35] In addition, the ability to use alloys such as a-Si1-xGex and a-Si1-xCx increases the ability to tune the index of this system.

A more exciting approach, however, is to grow a silicon-compatible waveguide (e.g., an amorphous SiGe alloy), with an embedded ULRSP structure (e.g., FIG. 5). This is contained in a linear Fabry-Perot resonator with Bragg mirrors (FIG. 7) and offers a much-reduced dimension modulator (~20 μm) and improved signal contrast. The structure affords a long effective interaction length in a short space. The ULRSP is operated near minimum loss, with the carrier density primarily modulating the effective mode index. Note that a high-Q plasmonic resonator is possible only with a low-loss SP mode. The small index change modifies the resonant transmission peak of the Fabry-Perot (see FIG. 7). This device, with a mirror separation of only 20 μm has an effective photon lifetime of ~3 ps, and has an optical limit of greater than 100 GHz switching rates. Another configuration is a switch that regulates the transfer of power between an ULRSP waveguide and a dielectric waveguide. This is illustrated in FIG. 8. This device acts as a high-speed switch.

When optical energy is transported and manipulated with planar plasmonic elements on a Si chip, many more interesting optoelectronic systems are provided. For example, a plasmon resonator, which concentrates the field into a highly intense localized region, is coupled to a switchable waveguide (FIG. 8). Such a resonator is the central element in a high-sensitivity, high-spatial-resolution, chip-based single molecule detector as illustrated in FIG. 9.

With regard to the lateral width of the waveguide, lateral confinement changes the mode structure, but, in general, still leads to long-range modes which can be modulated as described above.[33] Optical coupling to the plasmon waveguides is also an area of interest. End-fire or butt coupling has been used in these examples. However, grating coupling as discussed earlier provides an interesting alternative. Devaux et al. have demonstrated optical coupling into and out of surface plasmon modes using microarrays of sub-wavelength holes and gratings milled into the metal film.[36] As discussed in the fabrication section below, such structures are routinely prepared with our nanoscale lithography facilities and are within the limits of conventional deep UV lithographic patterning.

To further the overall goal of this project to develop the fundamental optical concepts and the basic materials science required to realize Si-compatible plasmonic devices of the types discussed above, we provide optical modeling, development of models to predict plasmon mode propagation in layered and patterned structures; materials and process development, development of processing and patterning techniques to define plasmonic couplers, resonators, waveguides and modulators; elucidation of fundamental properties of ULRSPs, experimental demonstrations of ULRSPs and determination of their properties using visible wavelength structures; and extension to telecommunication wavelengths, implementation of designs and processes on Si substrates.

Optical Modeling

To develop an understanding of the basic science of plasmonic systems, assist in interpretation of experimental results, and predict and test structure designs that support ULRSPs in Si-compatible configurations and visible wavelength analogs, we refine designs for structures for guiding, coupling, and modulation, extension to calculate vector fields of 2D and 3D modes, and then apply these calculations to test the feasibility of the ideas for other wavelength regimes such as the MWIR (3-5 μm range).

The modeling process we employ involves several different codes. In the first approach, the wavenumber of the plasmon mode and optical waveguide mode is calculated using a transfer matrix code. A transfer matrix connects the two E and H fields at either side of an interface. The nature of this matrix depends on whether the field is either transverse electric (TE) or transverse magnetic (TM). The behavior of a given multilayer structure, specified by a sequence of thicknesses and refractive indices, is then described by a product of each layer matrix. The imposition of the condition that the fields are damped in the sub- and superstrate regions yields an eigenvalue equation for the allowed transverse wavenumbers. In the case where all the materials possess real refractive indices, the real roots of this equation correspond to the guided modes of the structure. With the known roots, the field patterns throughout the structure are then calculated. Surface plasmons, of course, require materials with a complex refractive index, and we have implemented a routine to find the resulting complex roots.

This model allows the determination of the optimum metal and oxide thicknesses for the long-range surface plasmon propagation, the allowed index differences in an asymmetric geometry. FIGS. 2-5 were calculated using this code. This code is also used to calculate the splitting of the symmetric and antisymmetric field combinations of the dielectric and plasmon modes when the two waveguides are coupled. The difference between these wave numbers, which depends on the degree of coupling between the modes, then determines the distance over which power transfer takes place between dielectric and waveguide modes as shown in FIG. 7.

Another electromagnetic code WVase-32 (J. J. Woollam, Co.) is used to calculate the fields, transmission and reflection of the incident waves for a given multilayer stack. In our preliminary work, we have used this model to define visible wavelength multiple layer structures that can be used to demonstrate ULRSPs as discussed below. FIG. 10 shows a structure that supports long-range surface plasmons with an incident wavelength of 633 nm. The angular width of a mode is proportional to the imaginary part of the surface plasmon wavevector, which is inversely proportional to the propagation length. This clearly shows a single, uncoupled mode for the thicker metal film (blue curve—rightmost dip). Whereas, for the thinner film (red curve—leftmost dip) the modes on either side of the metal are coupled, leading to the symmetric and asymmetric splitting. Using this type of simple test structure we easily vary physical parameters in our study of the ULRSPs to evaluate, for example, the $SiO_2$ thickness to identify the transition from bound to radiative modes observed in FIG. 4.

Figure 11:
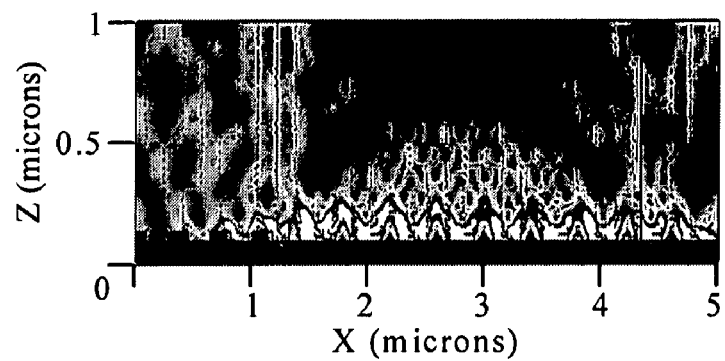
FIG. 11: Modeled intensity distribution for a grating coupler launching 1500 nm light down a plasmon waveguide. A plane wave is incident from above. The medium is idealized silicon (n=3.5, k=0) (top) with a gold grating and waveguide at the bottom. There is mirror symmetry about the vertical left axis, so only 3.5 of the 7 grooves in the grating are observed.

While the above approaches allow evaluation of designs and assist intuitive understanding of results, the primary tool for our modeling efforts is electromagnetic field simulations using the finite element package COMSOL Multiphysics (formerly called FEMLAB). This package includes electromagnetic modules designed specifically for wave propagation. This software was used to model several geometries that were previously studied using custom code. Very good agreement was observed, increasing confidence in the package. An example simulation is shown in FIG. 11. Here a plane wave at 1.5 μm incident from above excites a grating coupler and launches a plasmon down a gold waveguide.

These and similar simulations are used to model ULRSP configurations while varying the excitation wavelength, geometries (e.g., layer thicknesses), dielectric functions of the metals and dielectrics, essentially while varying any of the parameters that can be controlled or tuned through processing. These are then used as input both for interpreting experimental results and for shortening optical element design time.

Comsol Multiphysics also has an ordinary differential equation solver that can be used to calculate the 3D vector fields using the Method-of-Lines[37]. This technique has been successfully applied to plasmonic structures and assists in the 3D design of our devices. We also use the Department of Defense (DOD) High-Performance Computing Facilities for some of our modeling work. The concepts of this invention are applied to the 3-5 μm band, which is of military interest for sensor fusion, routing medium wavelength infrared (MWIR) signals on-chip and signal processing. These results show how silicon photonic circuits work in the long wavelength infrared (LWIR) band (8-14 μm).

Materials and Process Development

Basic materials science and fabrication techniques are developed to realize novel plasmonic optical elements such as resonators, beam splitters, and interferometers. Fabrication of the visible wavelength ULRSP analogs is discussed below, as well as the production of Si-based ULRSP waveguides, thus enabling entirely new functions on a chip. Here we discuss several key materials and processing activities.

Figure 12:
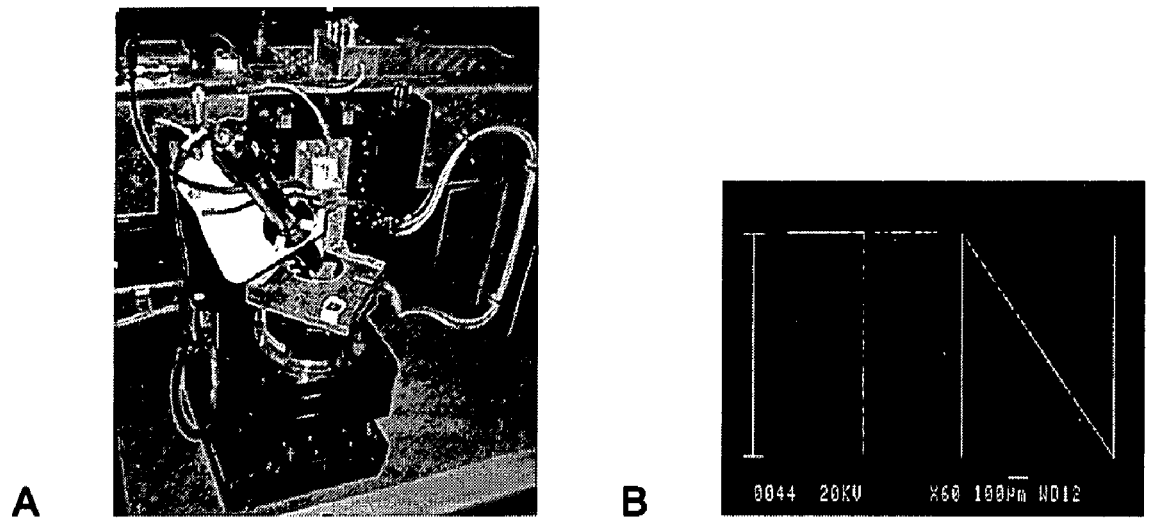
FIG. 12: Long-travel near-field scanning optical microscope (NSOM) developed by ITN Energy Systems, Inc. and Colorado School of Mines for prototype lithography (A) and 1 mm tall letters written using the NSOM (B).

Advanced lithography is central to this study. Our team focuses on adapting existing techniques to construct specific plasmonic elements. Fabrication of these elements and ULRSP waveguides requires patterning at length scales ranging from sub-wavelength for grating couplers to millimeter lengths for waveguides. A long-travel near-field scanning optical microscope (NSOM) was developed specifically for prototype lithography with a continuous write field of 4"×4" (FIG. 12). One-millimeter tall letters and line widths as small as 75 nm have been demonstrated with this instrument, but lengths can be much longer. The X and Y stage motions are synchronized to generate the arbitrary curves necessary for making complex waveguide structures such as Mach Zehnder interferometers.

Figure 13:
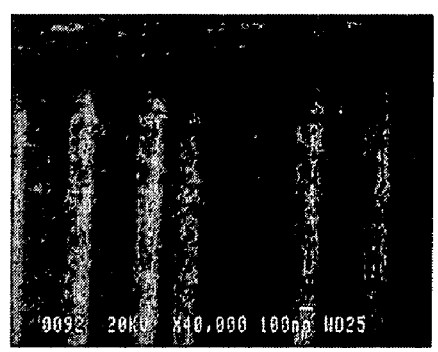
FIG. 13: Off-angle Scanning Electron Microscope (SEM) image of a linear transmission test structure.

Through an active NSF STTR Phase II contract[38] high-efficiency surface plasmon enhanced probes for near field microscopes are developed. E-beam lithography is used to generate wavelength scale gratings surrounding sub-wavelength apertures in metal films. FIG. 13 shows a linear test structure fabricated under the NSF program. A linear grating was cut into plasma enhanced chemical vapor deposition (PECVD) grown SiNx using broad beam argon ion milling. A gold film was deposited over the grating using electron beam evaporation, and an aperture was cut through the gold using ion milling. Patterning for both grating and aperture was done in ITN Energy System's e-beam facility. Similar gratings with no aperture are used to couple light into or out of surface plasmon elements, or used for mode coupling between conventional and plasmon waveguides. Gratings with an aperture couple light out of waveguides into a silicon photodiode for conversion into an electronic signal. A new field-emission SEM with nanopatterning capability extends nanolithography capabilities to even higher spatial resolution.

High-quality metal and dielectric layers with controlled thickness are also important to this invention. Particular emphasis is placed on the oxide layer or layers adjacent to the metal in ULRSP waveguides. One of these forms the gate dielectric in FIG. 6 and thickness control is important both for electrical device performance and, as noted in FIG. 4, for maximizing plasmon propagation length. The capping layer for the entire waveguide structure is another important component since its index of refraction must be tuned to a value near that of the Si substrate and it must not introduce significant loss. Oxidation furnaces are used for growing high-quality thermal $SiO_2$, processing tools for spin-on deposition of polymers and glasses, and a four-gun high-performance sputter deposition system with both RF and DC sources and capability is used for depositing a broad range of metals and oxides simultaneously and in sequence. The latter is useful in depositing multilayer dielectric stacks for the resonator terminating Bragg reflectors in the design in FIG. 7. Materials deposition techniques are used, as described below, and for extremely thin oxides where more control is important, atomic layer deposition (ALD) provides an ideal technique for growing dielectrics with monolayer control. The technique is being widely used in the research community for the development of next generation high k gate dielectrics.[39] The ALD reactor has been proven for alumina, $Al_2O_3$. While alumina is not a good choice for a gate dielectric, it is useful for testing optical properties of ULRSP waveguides on silicon or in the visible wavelength analogues discussed below. Regarding choosing preferred materials for the thin dielectric layer next to the metal, modeling results in FIG. 3 show a tradeoff between the index of refraction and allowed thickness of the oxide layer. Initial work focuses on $SiO_2$, alternative higher index oxides in addition to alumina such as $HfO_2$ (n=1.97 at 1.5 μm), $Ta_2O_5$ (n=2.10), $TiO_2$ (n=2.25), and $Nb_2O_5$ (n=2.3) to relax thickness tolerance constraints. In working with these materials we borrow from the considerable effort focused on alternative gate dielectrics in the microelectronics industry with the semiconductor technology roadmap indicating the need to replace $SiO_2$ by 2008. We study deposition of these materials, and use optical (ellipsometry) and structural characterization to determine their suitability for ULRSP devices.

For the capping layer, amorphous silicon grown by plasma enhanced chemical vapor deposition (PECVD) provides an attractive, low temperature method. To tune the index of this layer we use a-SiC and a-SiGe alloys. Ellipsometric characterization of the real and imaginary indices of a-Si and alloy layers are used to determine the growth conditions required for a desired index of refraction while minimizing loss. Preliminary work indicates that a good match to the Si substrate and sufficiently low dielectric loss for chip scale lengths (~100 μm) can be achieved. This is supported by demonstrations of a-Si based waveguides in the literature.[34,40,41] We note that recrystallization of a-Si to form nanocrystalline Si is an interesting way of achieving much longer propagation lengths.[42] This is particularly interesting in designs where the metal component of the waveguide has oxides both above and below it, since this allows larger grain size approaches such as metal-induced lateral crystallization to be employed.

Fundamental Properties of ULRSPs.

We fabricate planar, optical analogue test structures and measure electrical and optical characteristics such as propagation and coherence lengths, losses, temporal evolution, and field intensities. Visible wavelength-coupled dielectric waveguide/surface plasmon structures are used to isolate plasmonic effects in easily-measurable configurations to provide fundamental information necessary for the design of active Si-based devices and also information to be fed back into the modeling.

We fabricate multilayer planar test structures that exhibit ULRSPs, and explore the relationship between structural and electromagnetic properties. The work is guided by model results and begins with configurations similar to that illustrated in FIG. 10. In this multilayer design the dielectrics that sandwich the metal film are both $SiO_2$ and the observed modes are the conventional LRSP excitations. Similar behavior is achieved with polymer dielectric layers, which are available with higher indices[43]. We observe the ULRSP in a structure where there is a thin low-index layer on one or both sides of the metal. In that case, $SiO_2$ is the thin lower-index dielectric layer next to the metal. Fabrication of such a device begins with a high-index glass or sapphire substrate (or semicylinder to simplify reflectivity studies). Ag is then thermally evaporated followed by sputter, PECVD, or atomic layer deposition of silicon dioxide. The polymer (polycarbonate) is deposited by standard polymer thin film coating techniques such as dip or spin coating. Samples with a broad range of Ag film and oxide thicknesses are easily prepared by this approach. Variations on this design are implemented using, for example, alternative polymers with different indices. A similar structure, based on a symmetric sandwich design has been demonstrated[44]. Care must be taken that subsequent processing does not damage the first polymer layer, but this is possible since metallization of polycarbonates is a routine part of DVD manufacture.

As discussed above, as the oxide thickness increases, the ULRSP mode decays more slowly into the dielectric layers and has reduced intensity in the metal. The effective index of refraction of the mode becomes more like the surrounding dielectric as the range of the excitation increases. Measuring the dispersion relation of the waveguide modes is, therefore, important to confirming ULRSP excitation, determining optimal properties, and to providing input for model refinement. Surface plasmons can be detected by configurations in which the transfer of energy from an incoming optical beam to the surface plasmon excitation is measured through the power reflectivity ratio. This is the geometry diagramed in FIG. 10. This so-called "surface plasmon resonance" method is a mature technique that is used for a variety of thin film characterization and low-level detection schemes[45]. This method exploits the "Kretschmann configuration," in which evanescent optical fields are adjusted (by changing the internal angle of incidence) so that the wave vector parallel to the metal interface matches the surface plasmon wave vector.[11] This leads to a dip in the reflectivity that is very sensitive to the optical properties of both the metal film and the ambient medium. From the characteristics of this reflectivity feature both the real and the imaginary parts of the surface plasmon wavevector are determined.[46] By designing the resonance to occur in the near-infrared and using a tunable Ti-sapphire laser for excitation, both the angle and the optical excitation wavelength are varied, allowing the full dispersion relation to be mapped in a range of wavelengths.

A problem with the surface plasmon resonance method is that all phase information is lost. Using a technique that is capable of registering changes in optical phase, allows prediction of how the sample will perform in a device in which optical phase is important (such as in a thin-film waveguide interferometer). This is accomplished with ellipsometry, a technique that detects the polarization character of light with very high precision[47]. In an ellipsometer one is essentially comparing the nature of the p-polarized and s-polarized beam characteristics, maintaining not only the amplitude but also the phase information. So, in the case where only p-polarized light interacts with the surface plasmon, one is able to directly measure the modification of the optical phase of that channel by comparison to s-polarized light (which does not interact with the surface plasmon). Such measurements are performed using a commercial variable angle spectroscopic ellipsometer.

Figure 14:
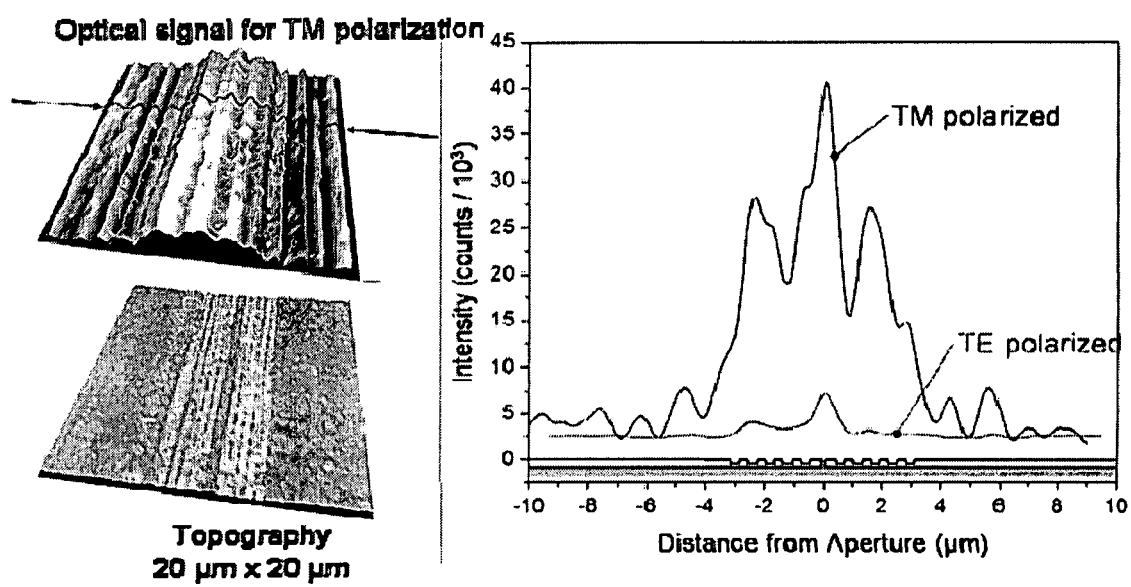
FIG. 14: NSOM imaging of a linear aperture array similar to the one shown in FIG. 8. Bottom left is an atomic force microscope (AFM) topographic image. Top left is a near-field image of optical emission from the structure. The right graph shows traces across the near field image for light polarized parallel (TE) and perpendicular (TM) to the grating direction.

Measurements of surface plasmon propagation length as a function of, for example, oxide layer thickness are also performed in these structures following approaches such as that of Lamprecht et al.[48] In this measurement, prism coupling is used to launch an LRSP. Imperfections in the metal film and at the film dielectric interface lead to scattering of the surface plasmon into propagating optical fields, which is imaged with a charge coupled device (CCD) detector. Using this approach, surface plasmon propagation lengths from tens to several hundred microns were measured for Au and Ag films on $SiO_2$. In the present case, instead of prism coupling, nanoscale patterning techniques as discussed above are used to create grating or hole array couplers to convert photons to surface plasmons (This is a first step in the direction of the Si-based test structures). Alternative approaches to imaging the scattered light include scanning a high-resolution near-field scanning optical microscope (NSOM) tip over the sample. The tip can be used in collection mode and coupled to a sensitive visible (or for the Si structures discussed below) IR detector. (FIG. 14).

Extension to Telecommunication Wavelength

The following extends the efforts described above to Si substrates and telecommunications wavelengths. A central goal is to show how the properties of ULRSP modes change, and what materials and processing modifications must be made, as we shift from low dielectric constant (e.g., glass) substrates to Si. We initially focus on the individual components required to fabricate silicon based ultra-long range plasmon waveguides and modulators. Planar structures analogous to those on sapphire discussed above are studied to extract dispersion relations, phase information, and propagation lengths. Since these are not built into waveguide structures and devices such as diodes or MOS capacitors are not present, demonstration of electrical modulation is not possible. Free carriers in the Si under the oxide are, however, selectively excited optically using an excitation wavelength below the a-Si:H bandgap. In this way, the effect of free carriers on the propagation length is studied.

Integration of elements into device structures described above is guided by modeling activities validated by visible wavelength test structures. This computational modeling is important because the number of steps and processing time involved in making waveguides and modulators can be quite large. FIG. 15, for example, shows a simplified process flow for a design that uses an integrated Schottky diode to modulate carrier concentration. In this case, an oxide layer is not included so it's closer to the conventional LRSP design. The process began by growing 500 Å of thermal oxide or PECVD SiN over a full 3" wafer. This layer isolated the contact pads and leads from the substrate. A positive photoresist, Shipley 510A, was spun onto the wafer with a thickness of 1.4 µm. Conventional contact lithography was used to create openings in the resist for ohmic contact formation. Aluminum lift-off was used to form the ohmic contacts. In a second photolithography step, contact leads were fabricated by lift-off of a titanium-gold stack. The titanium acts as an adhesion layer while the gold provides good contrast during subsequent electron beam lithography steps. Alignment marks for the e-beam lithography were also fabricated at the same time as the contact pads. The devices were grouped into 1 $cm^2$ cells with a yield of 10 cells per wafer.

The remaining patterning was done using electron beam lithography. For the waveguide structure, the oxide/nitride was stripped from the entire wafer followed by a blanket deposition of Ti/Ag. The first e-beam lithography step generated input and output surface plasmon coupling gratings with periods ranging from 310 nm to 430 nm. Taking into account the Si index, these periods correspond to free space wavelengths bracketing 1.5 µm. Broad beam ion milling was used to etch the grating ~150 Å into the surface. About 3000 Å of amorphous silicon was blanket deposited over the entire chip. The waveguides were defined by lifting off 400 Å of titanium in the second e-beam lithography step. The titanium acted as a hard mask during broad beam ion milling to remove the unwanted amorphous silicon and silver. In this case, the contact leads had 400 Å of titanium under the gold to ensure that the contacts were not also removed during milling.

The most straightforward approach to making an integrated LRSP-based modulator is to insert a short plasmon stripe modulator with appropriate coupling along a silicon rib or photonic crystal waveguide. An amorphous silicon alloy waveguide can also be grown on top of an ultra-long-range plasmon waveguide modulator. This approach is illustrated in FIG. 8. The coupling efficiency between the alloy and plasmon waveguide can be adjusted through the free carrier-induced change in the silicon index of refraction. If the plasmon energy is dumped, the signal in the dielectric waveguide is modulated; alternatively, this device can act as a high-speed switch.

REFERENCES

[1] R. Soref, "Silicon photonics technology: past, present and future," Proc. SPIE 5730, 19 (2005).
[2] M. Salib, M. Morse, L. Liao, R. Jones, D. Samara-Rubio, A. Liu, A. Alduino, M. Paniccia, "Silicon photonics," Intel Technology Journal, 8, 1535 (2004).
[3] A. Sciuto, S. Libertino, S. Coffa, and G. Coppola, "Miniaturizable Si-based electro-optical modulator working at 1.5 µm," Appl. Phys. Lett. 86, 201115-201111 (2005).
[4] A. Cutolo, M. Iodice, A. Irace, P. Spirito, and L. Zeni, "An electrically controlled Bragg reflector integrated in a rib silicon on insulator waveguide," Appl. Phys. Lett. 71, 199 (1997).
[5] A. Liu, R. Jones, L. Liao, D. Samara-Rubio, D. Rubin, O. Cohen, R. Nicolaescu, and M. Paniccia, "A high-speed silicon optical modulator based on a metal-oxide-semiconductor capacitor," Nature 427, 615 (2004).
[6] L. Ling, D. Samara-Rubio, M. Morse, A. Liu, D. Hodge, D. Rubin, U. D. Kell, and T. Franck, "High speed silicon Mach-Zehnder modulator," Optics Express 13, 3129 (2005).
[7] R. A. Soref and B. R. Bennett, "Electrooptical effects in silicon," IEEE J. Quantum Electron. QE-23, 123-129 (1987); R. A. Soref and B. R. Bennett, "Electrooptical effects in silicon," IEEE J. Quantum Electron. QE-23, 123-129 (1987). R. A. Soref and B. R. Bennett, "Kramers-Kronig analysis of electro-optical switching in silicon," Proc. SPIE—Int. Soc. Opt. Eng. (USA) 32-37 (1987).

[8] M. A. Green, Silicon Solar Cells, (University of New South Wales, Sydney, 1995) p. 48.
[9] S. A. Maier, "Plasmonics—Towards Subwavelength Optical Devices," Current Nanoscience 1, 17 (2005).
[10] C. A. Barrios, V. R. de Almeida, and M. Lipson, "Low-power-consumption short-length and high-modulation-depth silicon electrooptic modulator," J. Lightwave Technol. 21, 1089-1098 (2003).
[11] H. Raether, Surface Plasmons (Springer, Berlin, 1988).
[12] W. L. Barnes, A. Dereux, and T. W. Ebbesen, "Surface plasmon subwavelength optics," Nature 424, 824 (2003).
[13] J. Yongqiang, J. Wei, G. Lanlan, C. Xiaonan, and R. T. Chen, "80-micron interaction length silicon photonic crystal waveguide modulator," Appl. Phys. Lett. 87, 221105 (2005).
[14] H. Ditlbacher, J. R. Krenn, G. Schider, A. Leitner, and F. R. Aussenegg, "Two-dimensional optics with surface plasmon polaritons," Appl. Phys. Lett. 81, 1762 (2002).
[15] T. Nikolajsen, K. Leosson, and S. I. Bozhevolnyi, "Surface plasmon polariton based modulators and switches operating at telecom wavelengths," Appl. Phys. Lett. 85, 5833 (2004).
[16] I. I. Smolyaminov, D. L. Mazzoni, J. Mait, and C. C. Davis, "Experimental study of surface-plasmon scattering by individual surface defects," Phys. Rev. B56, 1601 (1997).
[17] S. A. Maier, P. G. Kik, M. L. Brongersma, and H. A. Atwater, "Electromagnetic energy transport below the diffraction limit in periodic metal nanostructures," Proceedings of the SPIE 4456, 22 (2001).
[18] J. C. Weeber, J. R. Krenn, A. Dereux, B. Lamprecht, Y. Lacroute, and J. P. Goudonnet, "Near-field observation of surface plasmon polariton propagation on thin metal stripes," Phys. Rev. B 64, 045411-045411 (2001).
[19] E. Ozbay, "Plasmonics: Merging photonics and electronics at nanoscale dimensions," Science 311, 189 (2006).
[20] H. Ditlbacher, J. R. Krenn, G. Schider, A. Leitner, and F. R. Aussenegg, "Two-dimensional optics with surface plasmon polaritons," Appl. Phys. Lett. 81, 1762 (2002).
[21] I. I. Smolyaminov, D. L. Mazzoni, J. Mait, and C. C. Davis, "Experimental study of surface-plasmon scattering by individual surface defects," Phys. Rev. B56, 1601 (1997).
[22] S. A. Maier, P. G. Kik, M. L. Brongersma, and H. A. Atwater, "Electromagnetic energy transport below the diffraction limit in periodic metal nanostructures," Proceedings of the SPIE 4456, 22 (2001).
[23] A. Cutolo, M. Iodice, A. Irace, P. Spirito, and L. Zeni, "An electrically controlled Bragg reflector integrated in a rib silicon on insulator waveguide," Appl. Phys. Lett. 71, 199 (1997).
[24] Ansheng Liu, Richard Jones, Ling Liao, Dean Stamara-Rubio, Doron Rubin, Oded Cohen, Remus Nicolaescu, and Mario Paniccia, "A high-speed silicon optical modulator based on a metal-oxide-semiconductor capacitor," Nature 427, 615 (2004).
[25] M. A. Green, Silicon Solar Cells, (University of New South Wales, Sydney, 1995) p. 48.
[26] D. Sarid, "Long-range surface-plasma waves on very thin metal films," Phys. Rev. Lett. 47, 1927 (1981).
[27] R H. Ritchie, "Surface Plasmons in Solids", Surf. Sci. 34, 1 (1973).
[28] E. Burstein, W. P. Chen, Y. J. Chen, and A. Harstein, "Surface polaritons-Propagating electromagnetic model at interfaces," J. Vac. Sci. Technol. 11, 1004 (1974).
[29] A. Otto, Z. Phys. 216, 398 (1968).
[30] J. L. Robins, Proc. Phys. Soc. 79, 119 (1962).
[31] P. Berini, R. Charbonneau, N. Lahoud, and G. Mattiussi, "Characterization of long-range surface-plasmon-polariton waveguides," J. of Appl. Phys. 98, 43109 (2005).
[32] J. Chilwell and I. Hodgkinson, "Thin films transfer matrix theory of planar multilayer waveguides and reflection from prism-loaded waveguides," JOSA A v1 p 742, 1984.
[33] R. Charbonneau, P. Berini, E. Berolo, and E. Lisicka-Shrzek, "Experimental observation of plasmon-polariton waves supported by a thin metal film of finite width," Opt. Lett. 25, 844-846 (2000).
[34] A. Harke, M. Krause, and J. Mueller, "Low-loss singlemode amorphous silicon waveguides," Electron. Lett. 41, 1377-1379 (2005).
[35] G. Cocorullo, F. G. Della Corte, R. De Rosa, I. Rendina, A. Rubino, and E. Terzini, "Fast infrared light modulation in a-Si:H micro-devices for fiber-to-the-home applications," J. Non-Cryst. Solids (Netherlands) 1247-1251 (2000).
[36] E. Devaux, T. W. Ebbesen, J. C. Weeber, and A. Dereux, "Launching and decoupling surface plasmons via microgratings," Appl. Phys. Lett. 83, 4936-4938 (2003).
[37] R. Pregla and W. Pascher, "The method of lines," in Numerical Techniques for Microwave and Millimeter Wave Passive Structures, T. Itoh, ed (New York: Wiley, 1989)
[38] NSF contract number DMI-0522281, "Surface plasmon enhanced high efficiency near-field probes", September/2005 to August/2007.
[39] Mohammad S. Akbar, Jack C. Lee, Naim Moumen, and Jeff Peterson, "Optimization of precursor pulse time in improving bulk trapping characteristics of atomic-layer-deposition HfO2 gate oxides", Appl. Phys. Lett. 88, 082901 (2006).
[40] G. Cocorullo, F. G. Della Corte, I. Rendina, C. Minarini, A. Rubino, and E. Terzini, "Amorphous silicon waveguides and light modulators for integrated photonics realized by low-temperature plasma-enhanced chemical-vapor deposition," Opt. Lett. 21, 2002-2004 (1996).
[41] M. J. A. de Dood, A. Polman, T. Zijlstra, and E. W. J. M. van der Drift, "Amorphous silicon waveguides for microphotonics," J. Appl. Phys. 92, 649-653 (2002).
[42] A. M. Agarwal, L. Ling, J. S. Foresi, M. R. Black, D. Xiaoman, and L. C. Kimerling, "Low-loss polycrystalline silicon waveguides for silicon photonics," J. Appl. Phys. 80, 6120-6123 (1996).
[43] I. D. Nikolov and C. D. Ivanov, "Optical plastic refractive measurements in the visible and the near-infrared regions", App. Opt. 39, 2067 (2000).
[44] T. Nikolajsen, K. Leosson, I. Salakhutdinov, and S. I. Bozhevolnyi, "Polymer-based surface-plasmon-polariton stripe waveguides at telecommunication wavelengths," Appl. Phys. Lett. 82, 668 (2003).
[45] J. Homola, S. S. Yee, and G. Gauglitz, "Surface plasmon resonance sensors," Sensors and Actuators B 54, 3 (1999).
[46] S. Byahut and T. E. Furtak, "A device for performing surface-plasmon-polariton-assisted Raman-scattering from adsorbates on single-crystal silver surfaces," Rev. Sci. Instrum. 61, 27 (1990).
[47] A. V. Nabok, A. Tsargorodskaya, A. K. Hassan, and N. F. Starodub, "Total internal reflection ellipsometry and spr detection of low molecular weight environmental toxins," Appl. Surf. Sci. 246, 381 (2005).
[48] B. Lamprecht, J. R. Krenn, G. Schider, H. Ditlbacher, M. Salerno, N. Felidj, A. Leitner, F. R. Aussenegg, and J. C. Weeber, "Surface plasmon propagation in microscale metal stripes," Appl. Phys. Lett. 79, 51-53 (2001).

The invention claimed is:

1. A modulator for varying an optical signal by varying an electrical signal or varying an electrical signal by varying an optical signal, the modulator comprising:
   an ultra-long-range surface plasmon (ULRSP) waveguide comprising
      Bragg mirror structures disposed at both ends thereof and forming a linear resonant Fabry-Perot structure,
      a metal layer; said metal layer being sufficiently thin to couple surface plasmons propagating along each surface of said metal layer;
      a first layer of a dielectric material contacting a first side of said metal layer and having a first refractive index;
      a second layer of a dielectric oxide, a first side of the second layer contacting a side of said metal layer opposite to the first side of said metal layer, wherein said second layer is electrically insulating and has a second refractive index lower than the first refractive index and a thickness effective to achieve ULRSP propagation;
      a third layer of a semiconductor material contacting a side of said second layer opposite to the first side of said second layer, the third layer having a third refractive index, the first and third refractive indices being substantially matched;
      wherein said metal, second, and third layers form a metal-oxide-semiconductor (MOS) capacitor; and
      means for inducing a selected voltage across said capacitor;
   wherein inducing the selected voltage across the capacitor controls transmission efficiency in the Fabry-Perot structure; and
   an optical waveguide coupled to the ULRSP waveguide, wherein the optical waveguide is a dielectric waveguide comprising a dielectric core layer, the core layer not forming any of the first, second, or third layer of the ULRSP waveguide.

2. The modulator of claim 1 wherein said optical waveguide is a visible-light optical waveguide.

3. The modulator of claim 1 wherein said optical waveguide is an infrared-light waveguide.

4. The modulator of claim 1 wherein said metal layer comprises a metal selected from the group consisting of silver, gold, copper, and aluminum.

5. The modulator of claim 1 incorporated into a chemical detector.

6. The modulator of claim 1 incorporated into a computer processor.

7. A modulator for varying an optical signal by varying an electrical signal or varying an electrical signal by varying an optical signal, comprising:
   an ultra-long-range surface plasmon (ULRSP) waveguide comprising
      a metal layer, said metal layer being sufficiently thin to couple surface plasmons propagating along each surface of said metal layer;
      a layer of a first material contacting a first side of said metal layer, the first material having a first refractive index and being selected from the group consisting of silicon, an amorphous $Si_{1-x}Ge_x$ alloy or an amorphous $Si_{1-x}C_x$ alloy;
      a layer of an oxide material, a first side of the oxide material layer contacting a side of said metal layer opposite to the first side of said metal layer, wherein said oxide material layer is electrically insulating, has a second refractive index lower than the first refractive index and has a thickness effective to achieve ULRSP propagation; and
      a layer of a silicon material contacting a side of the oxide material layer opposite to the first side of the oxide material layer, the silicon material having a third refractive index, the first and third refractive indices being substantially matched; and
   an optical waveguide coupled to the ULRSP waveguide.

8. The waveguide of claim 7, wherein the first material is silicon.

9. The waveguide of claim 8, wherein the optical waveguide is a dielectric waveguide and comprises a dielectric core layer, the core layer being sandwiched between two silicon layers, one of which is the layer of the first material.

10. The waveguide of claim 7, wherein the first material is amorphous silicon.

11. The waveguide of claim 7, wherein the metal layer has a thickness from 20 to 30 micrometers.

12. The waveguide of claim 7, wherein the oxide material has a thickness less than 10 nm.

13. The waveguide of claim 7, wherein the oxide material has a thickness from 10 to 20 nm.

14. The waveguide of claim 7, wherein the optical waveguide is a dielectric waveguide comprising a dielectric core layer, the core layer not forming any of the first, second or third layer of the ULRSP waveguide.

15. The waveguide of claim 7, further comprising means for inducing a selected voltage across the metal layer and the layer of silicon material contacting the side of the layer of oxide material opposite to the first side of the layer of oxide material.

* * * * *